US008574729B2

(12) United States Patent
Makino et al.

(10) Patent No.: US 8,574,729 B2
(45) Date of Patent: Nov. 5, 2013

(54) MAGNETIC STRUCTURE INCLUDING TWO FERROMAGNETICALLY COUPLED MAGNETIC LAYERS AND METHOD OF MANUFACTURING SAME

(75) Inventors: Kenzo Makino, Tokyo (JP); Masashi Sano, Tokyo (JP); Atsushi Yamaguchi, Tokyo (JP)

(73) Assignee: TDK Corporation, Tokyo (JP)

( * ) Notice: Subject to any disclaimer, the term of this patent is extended or adjusted under 35 U.S.C. 154(b) by 1321 days.

(21) Appl. No.: 12/081,914

(22) Filed: Apr. 23, 2008

(65) Prior Publication Data
US 2009/0268349 A1 Oct. 29, 2009

(51) Int. Cl.
*G11B 5/127* (2006.01)
*H01L 43/12* (2006.01)

(52) U.S. Cl.
USPC ... 428/816; 428/815; 428/692.1; 360/125.01; 360/128; 205/119

(58) Field of Classification Search
None
See application file for complete search history.

(56) References Cited

U.S. PATENT DOCUMENTS

| 6,456,468 B1* | 9/2002 | Hayashi ............... 360/324.1 |
| 6,771,464 B2 | 8/2004 | Minor |
| 6,955,925 B1* | 10/2005 | Donohue et al. ............ 438/3 |
| 2002/0186504 A1* | 12/2002 | Yari et al. ............... 360/126 |
| 2003/0199134 A1* | 10/2003 | Marsh et al. ............... 438/200 |
| 2005/0045468 A1* | 3/2005 | Hwang et al. ............ 204/192.15 |
| 2005/0144775 A1* | 7/2005 | Yamaguchi et al. ....... 29/603.01 |
| 2009/0128952 A1* | 5/2009 | Sato et al. ............... 360/125.02 |
| 2010/0181869 A1* | 7/2010 | Pereira da Cunha et al. . 310/313 R |

FOREIGN PATENT DOCUMENTS

| JP | 05128439 A * | 5/1993 |
| JP | A-2002-175608 | 6/2002 |
| JP | 2004158522 A * | 6/2004 |

OTHER PUBLICATIONS

Abstract Translation of JP 05-128439 A (Pat-No. JP405128439 A) (patent published 1991).*
Abstract Translation of JP 2004-158522 A (Derwent-Acc-No. 2004-491118) (patent published 2004).*

* cited by examiner

*Primary Examiner* — Kevin Bernatz
(74) *Attorney, Agent, or Firm* — Oliff & Berridge, PLC

(57) ABSTRACT

A magnetic structure includes a first magnetic layer, a nonmagnetic insulating layer, a nonmagnetic adhesion layer disposed on the top surfaces of the first magnetic layer and the nonmagnetic insulating layer, and a second magnetic layer disposed on the nonmagnetic adhesion layer. The nonmagnetic insulating layer contains an oxygen atom. The nonmagnetic adhesion layer is composed of one element or a plurality of elements selected from the group consisting of Al, Si and nonmagnetic transition metal elements except Ru, and the bond enthalpy of a diatomic molecule composed of an atom of the one element or each of the plurality of elements and an oxygen atom is 400 kJ/mol or higher. The nonmagnetic adhesion layer has a thickness within a range of 0.3 to 0.8 nm. The first magnetic layer and the second magnetic layer are ferromagnetically coupled to each other.

14 Claims, 24 Drawing Sheets

MAGNETIC STRUCTURE INCLUDING TWO FERROMAGNETICALLY COUPLED MAGNETIC LAYERS AND METHOD OF MANUFACTURING SAME

BACKGROUND OF THE INVENTION

1. Field of the Invention

The present invention relates to a magnetic structure for use in, for example, a magnetic head of a magnetic read/write apparatus, the magnetic structure including two magnetic layers ferromagnetically coupled to each other, and to a method of manufacturing such a magnetic structure.

2. Description of the Related Art

Higher recording density is constantly required of a magnetic read/write apparatus such as a magnetic disk drive so as to achieve a higher storage capacity and smaller dimensions. Typically, a thin-film magnetic head for use in a magnetic read/write apparatus has a structure in which a read head having a magnetoresistive element (hereinafter also referred to as an MR element) for reading and a write head having an induction-type electromagnetic transducer for writing are stacked on a substrate. The induction-type electromagnetic transducer includes a coil that generates a magnetic field corresponding to data to be written on a recording medium, and a pole layer that allows a magnetic flux corresponding to the magnetic field generated by the coil to pass and generates a write magnetic field for writing the data on the recording medium.

Examples of the write head include those of a longitudinal magnetic recording system wherein signals are magnetized in the direction along the plane of the recording medium (the longitudinal direction), and those of a perpendicular magnetic recording system wherein signals are magnetized in the direction perpendicular to the plane of the recording medium. Recently, a shift from the longitudinal magnetic recording system to the perpendicular magnetic recording system has been promoted in order to achieve higher recording density of magnetic read/write apparatuses.

An example of a method of manufacturing a magnetic head will now be described. In this method, first, components of a plurality of magnetic heads are formed on a single substrate to thereby fabricate a magnetic head substructure in which a plurality of pre-head portions that will become the respective magnetic heads later are aligned in a plurality of rows. Next, the substructure is cut into a plurality of head aggregates each of which includes a plurality of pre-head portions aligned in a row. Next, a surface formed in each head aggregate by cutting the substructure is lapped to thereby form medium facing surfaces of the pre-head portions included in each head aggregate. Next, flying rails are formed in the medium facing surfaces. Next, each head aggregate is cut so that the plurality of pre-head portions are separated from one another, whereby the plurality of magnetic heads are formed.

In the process of manufacture of the magnetic heads, a second magnetic layer to be ferromagnetically coupled to a first magnetic layer is sometimes formed by plating over the first magnetic layer and a nonmagnetic insulating layer. In some cases, the nonmagnetic insulating layer is disposed adjacent to the first magnetic layer without overlapping the top surface of the first magnetic layer, and in other cases, the nonmagnetic insulating layer is disposed to cover a portion of the top surface of the first magnetic layer. The nonmagnetic insulating layer is formed of an inorganic insulating material such as alumina or an organic insulating material such as a thermosetting resin. To form the second magnetic layer by plating over the first magnetic layer and the nonmagnetic insulating layer, first, an electrode film for plating is formed on the first magnetic layer and the nonmagnetic insulating layer. Then, the second magnetic layer is formed on this electrode film by plating. In this case, the electrode film may be formed of a magnetic material in order to establish ferromagnetic coupling between the first magnetic layer and the second magnetic layer. However, an electrode film made of a magnetic material is typically low in adhesion to a nonmagnetic insulating layer. Consequently, if an electrode film of a magnetic material is formed on the first magnetic layer and the nonmagnetic insulating layer, the electrode film can peel off from the nonmagnetic insulating layer during processing for forming magnetic heads from the foregoing substructure, or cracking can occur in the electrode film due to thermal stress during a writing operation.

Conventionally, when an electrode film for plating is formed over a substrate and then a magnetic layer is formed on this electrode film by plating, there is known a technique in which, in order to enhance adhesion between the substrate and the electrode film, an adhesion layer made of a nonmagnetic metal material such as Ti, Cr, Al or Ta is formed on the substrate before forming the electrode film, as disclosed in, for example, JP-A-2002-175608. This adhesion layer typically has a thickness of 5 nm to several tens of nanometers.

In the case of forming an electrode film for plating over the first magnetic layer and the nonmagnetic insulating layer as mentioned above, too, such an adhesion layer can be formed on the first magnetic layer and the nonmagnetic insulating layer before forming the electrode film, for the purpose of enhancing adhesion between the nonmagnetic insulating layer and the electrode film.

Disadvantageously, however, if an adhesion layer made of a nonmagnetic metal material and having a thickness of 5 nm to several tens of nanometers is formed on the first magnetic layer and the nonmagnetic insulating layer and then the electrode film and the second magnetic layer are formed thereon, the presence of the adhesion layer between the first magnetic layer and the second magnetic layer precludes ferromagnetic coupling between the first magnetic layer and the second magnetic layer. When the first and second magnetic layers form a magnetic path for passing a magnetic flux corresponding to the magnetic field generated by the coil in the write head, if ferromagnetic coupling between the first and second magnetic layers cannot be established due to the presence of the adhesion layer, the magnetic flux passing through the first and second magnetic layers leaks at the location where the adhesion layer is present. As a result, the write head suffers problems such as a reduction in write magnetic field and erroneous writing or erasure of data on the recording medium caused by the leakage flux.

OBJECT AND SUMMARY OF THE INVENTION

It is an object of the present invention to provide a magnetic structure in which a second magnetic layer is disposed over a first magnetic layer and a nonmagnetic insulating layer, with a nonmagnetic adhesion layer provided in between, the magnetic structure allowing the nonmagnetic adhesion layer to adhere to the first magnetic layer and the nonmagnetic insulating layer and allowing ferromagnetic coupling between the first and second magnetic layers, and to provide a method of manufacturing such a magnetic structure.

A first magnetic structure of the present invention includes: a first magnetic layer having a top surface; a nonmagnetic insulating layer having a top surface, the nonmagnetic insulating layer being adjacent to the first magnetic layer without overlapping the top surface of the first magnetic layer; a nonmagnetic adhesion layer disposed on the top surfaces of the first magnetic layer and the nonmagnetic insulating layer; and a second magnetic layer disposed on the nonmagnetic adhesion layer. The nonmagnetic insulating layer contains an oxygen atom. The nonmagnetic adhesion layer is composed of one element or a plurality of elements selected from the group consisting of Al, Si and nonmagnetic transition metal elements except Ru, and the bond enthalpy of a diatomic molecule composed of an atom of the one element or each of the plurality of elements and an oxygen atom is 400 kJ/mol or higher. The nonmagnetic adhesion layer has a thickness within a range of 0.3 to 0.8 nm. The first magnetic layer and the second magnetic layer are ferromagnetically coupled to each other.

The first magnetic structure of the present invention may further include a third magnetic layer disposed on the second magnetic layer. The first magnetic structure of the present invention may be for use in a magnetic head.

A second magnetic structure of the present invention includes: a first magnetic layer having a top surface; a nonmagnetic insulating layer having a top surface, the nonmagnetic insulating layer being disposed to cover a portion of the top surface of the first magnetic layer; a nonmagnetic adhesion layer disposed on the top surfaces of the first magnetic layer and the nonmagnetic insulating layer; and a second magnetic layer disposed on the nonmagnetic adhesion layer. The nonmagnetic insulating layer contains an oxygen atom. The nonmagnetic adhesion layer is composed of one element or a plurality of elements selected from the group consisting of Al, Si and nonmagnetic transition metal elements except Ru, and the bond enthalpy of a diatomic molecule composed of an atom of the one element or each of the plurality of elements and an oxygen atom is 400 kJ/mol or higher. The nonmagnetic adhesion layer has a thickness within a range of 0.3 to 0.8 nm. The first magnetic layer and the second magnetic layer are ferromagnetically coupled to each other.

The second magnetic structure of the present invention may further include a third magnetic layer disposed on the second magnetic layer. The second magnetic structure of the present invention may be for use in a magnetic head.

A method of manufacturing the first magnetic structure of the present invention includes the steps of: forming the first magnetic layer and the nonmagnetic insulating layer; forming the nonmagnetic adhesion layer on the top surfaces of the first magnetic layer and the nonmagnetic insulating layer; and forming the second magnetic layer on the nonmagnetic adhesion layer.

In the method of manufacturing the first magnetic structure of the present invention, the nonmagnetic adhesion layer and the second magnetic layer may be formed successively in a vacuum.

The method of manufacturing the first magnetic structure of the present invention may further include the step of forming a third magnetic layer on the second magnetic layer. In this case, the third magnetic layer may be formed by plating.

A method of manufacturing the second magnetic structure of the present invention includes the steps of: forming the first magnetic layer; forming the nonmagnetic insulating layer; forming the nonmagnetic adhesion layer on the top surfaces of the first magnetic layer and the nonmagnetic insulating layer; and forming the second magnetic layer on the nonmagnetic adhesion layer.

In the method of manufacturing the second magnetic structure of the present invention, the nonmagnetic adhesion layer and the second magnetic layer may be formed successively in a vacuum.

The method of manufacturing the second magnetic structure of the present invention may further include the step of forming a third magnetic layer on the second magnetic layer. In this case, the third magnetic layer may be formed by plating.

According to the first magnetic structure, the second magnetic structure, and the methods of manufacturing the first magnetic structure and the second magnetic structure of the present invention, the nonmagnetic insulating layer contains an oxygen atom, the nonmagnetic adhesion layer is composed of one element or a plurality of elements selected from the group consisting of Al, Si and nonmagnetic transition metal elements except Ru, the bond enthalpy of a diatomic molecule composed of an atom of the one element or each of the plurality of elements and an oxygen atom is 400 kJ/mol or higher, and the nonmagnetic adhesion layer has a thickness within the range of 0.3 to 0.8 nm. This makes it possible to ensure adhesion of the nonmagnetic adhesion layer to the first magnetic layer and the nonmagnetic insulating layer, and also to establish ferromagnetic coupling between the first magnetic layer and the second magnetic layer.

Other and further objects, features and advantages of the invention will appear more fully from the following description.

DETAILED DESCRIPTION OF THE PREFERRED EMBODIMENT

Figure 1:
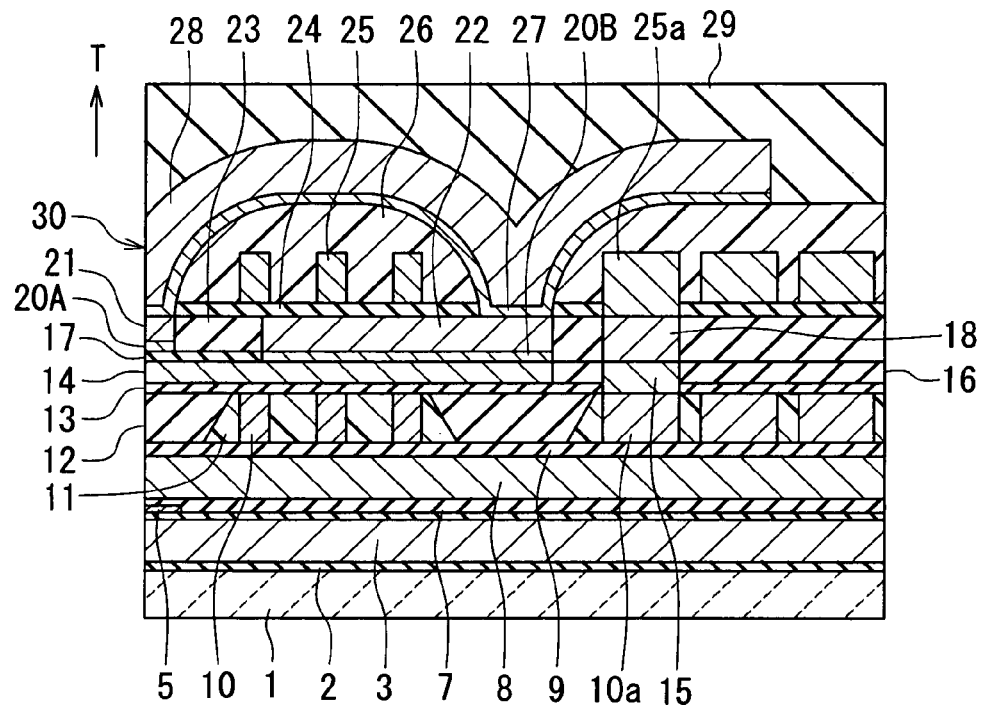
FIG. 1 is a cross-sectional view showing the configuration of a magnetic head of an embodiment of the invention.

An embodiment of the present invention will now be described in detail with reference to the drawings. Reference is first made to FIG. 1 to describe the configuration of a magnetic head of this embodiment. Here is given an example of a magnetic head for the perpendicular magnetic recording system. FIG. 1 is a cross-sectional view showing the configuration of the magnetic head. FIG. 1 shows a cross section perpendicular to the medium facing surface and the top surface of the substrate. The arrow marked with T in FIG. 1 shows the direction of travel of a recording medium.

As shown in FIG. 1, the magnetic head of the present embodiment has a medium facing surface 30 that faces toward the recording medium. The magnetic head includes: a substrate 1 made of a ceramic material such as alumina-titanium carbide ($Al_2O_3$—TiC); an insulating layer 2 made of an insulating material such as alumina ($Al_2O_3$) and disposed on the substrate 1; a first read shield layer 3 made of a ferromagnetic material and disposed on the insulating layer 2; and a first shield gap film 4 made of an insulating material such as alumina and disposed on the first read shield layer 3.

The magnetic head further includes: an MR element 5 disposed on the first shield gap film 4; two bias magnetic field applying layers (not shown) disposed adjacent to two sides of the MR element 5, respectively, with insulating films (not shown) respectively disposed therebetween; two leads (not shown) connected to the MR element 5; a second shield gap film 7 made of an insulating material such as alumina and disposed to cover the MR element 5, the bias magnetic field applying layers and the leads; and a second read shield layer 8 made of a ferromagnetic material and disposed on the second shield gap film 7.

Each of the first read shield layer 3, the first shield gap film 4, the MR element 5, the second shield gap film 7 and the second read shield layer 8 has an end located in the medium facing surface 30. The portion from the first read shield layer 3 to the second read shield layer 8 constitutes a read head. The second read shield layer 8 may be replaced with a layered film comprising two magnetic layers and a nonmagnetic layer disposed between the two magnetic layers. The nonmagnetic layer is formed of a nonmagnetic material such as ruthenium (Ru) or alumina.

The magnetic head further includes: an insulating layer 9 made of an insulating material such as alumina and disposed on the second read shield layer 8; a coil 10 made of a conductive material and disposed on the insulating layer 9; an insulating layer 11 disposed in the space between respective adjacent turns of the coil 10 and around the coil 10; and an insulating layer 12 disposed around the coil 10 and the insulating layer 11. The coil 10 is planar spiral-shaped. The coil 10 includes a connecting portion 10a that is a portion near an inner end of the coil 10 and connected to another coil described later. The insulating layer 11 is made of a thermosetting resin, for example. The insulating layer 12 is made of alumina, for example. The top surfaces of the coil 10 and the insulating layers 11 and 12 are planarized.

The magnetic head further includes an insulating layer 13 made of an insulating material such as alumina and disposed on the top surfaces of the coil 10 and the insulating layers 11 and 12. The insulating layer 13 has an opening formed in a region corresponding to the top surface of the connecting portion 10a.

The magnetic head further includes: a pole layer 14 made of a ferromagnetic material and disposed on the insulating layer 13; a connecting layer 15 made of a conductive material and disposed at the position of the opening of the insulating layer 13 to cover the connecting portion 10a; and an insulating layer 16 made of an insulating material such as alumina and disposed around the pole layer 14 and the connecting layer 15. The pole layer 14 has an end face located in the medium facing surface 30. The connecting layer 15 may be made of the same material as the pole layer 14. The top surfaces of the pole layer 14, the connecting layer 15 and the insulating layer 16 are planarized.

The magnetic head further includes a gap layer 17 made of a nonmagnetic insulating material and disposed to cover a portion of the top surface of the pole layer 14. In the present embodiment, the gap layer 17 is made of alumina, in particular. The gap layer 17 has an end face located in the medium facing surface 30. The magnetic head further includes a connecting layer 18 made of a conductive material and disposed on the connecting layer 15.

The magnetic head further includes: an electrode film 20A disposed on the gap layer 17; an electrode film 20B disposed on a region of the top surface of the pole layer 14 that is farther from the medium facing surface 30 than is a region where the gap layer 17 is disposed; a first write shield layer 21 made of a ferromagnetic material and disposed on the electrode film 20A; a yoke layer 22 made of a ferromagnetic material and disposed on the electrode film 20B; and an insulating layer 23 made of an insulating material such as alumina and disposed around the connecting layer 18, the first write shield layer 21 and the yoke layer 22. The first write shield layer 21 has an end face located in the medium facing surface 30. The top surfaces of the connecting layer 18, the first write shield layer 21, the yoke layer 22 and the insulating layer 23 are planarized. The electrode films 20A and 20B will be described in more detail later.

The magnetic head further includes an insulating layer 24 made of an insulating material such as alumina and disposed on the yoke layer 22 and the insulating layer 23. The insulating layer 24 has an opening for exposing the top surface of the first write shield layer 21, an opening for exposing a portion of the top surface of the yoke layer 22 located away from the medium facing surface 30, and an opening for exposing the top surface of the connecting layer 18.

The magnetic head further includes: a coil 25 made of a conductive material and disposed on the insulating layer 23; and an insulating layer 26 made of a nonmagnetic insulating material and disposed to cover the coil 25. The coil 25 is planar spiral-shaped. The coil 25 includes a connecting portion 25a that is a portion near an inner end of the coil 25 and connected to the coil 10. The connecting portion 25a is disposed on the connecting layer 18. This provides connection between the connecting portion 10a of the coil 10 and the connecting portion 25a of the coil 25 via the connecting layers 15 and 18. In the present embodiment, the insulating layer 26 is made of a thermosetting resin, in particular. The insulating layer 26 has a convex top surface.

The magnetic head further includes an electrode film 27 disposed on the top surface of the first write shield layer 21, on a portion of the top surface of the yoke layer 22 exposed from the opening of the insulating layer 24, and on a portion of the top surface of the insulating layer 26. The electrode film 27 will be described in more detail later. The magnetic head further includes a second write shield layer 28 disposed on the electrode film 27. A portion of the second write shield layer 28 is disposed above the first write shield layer 21 with the electrode film 27 disposed therebetween. Another portion of the second write shield layer 28 is disposed above the yoke layer 22 with the electrode film 27 disposed therebetween. The second write shield layer 28 has an end face located in the medium facing surface 30.

The magnetic head further includes an overcoat layer 29 made of an insulating material such as alumina and disposed to cover the second write shield layer 28. The portion from the coil 10 to the second write shield layer 28 constitutes a write head.

As described so far, the magnetic head has the medium facing surface 30 that faces toward the recording medium, the read head, and the write head. The read head and the write head are stacked on the substrate 1. The write head is disposed forward of the read head along the direction T of travel of the recording medium (that is, disposed closer to an air-outflow end of the slider described later). The magnetic head writes data on the recording medium through the use of the write head, and reads data stored on the recording medium through the use of the read head.

The read head includes: the MR element 5 disposed between the shield gap films 4 and 7; and the first read shield layer 3 and the second read shield layer 8 disposed to sandwich the shield gap films 4 and 7 and the MR element 5.

The write head includes the coil 10, the pole layer 14, the gap layer 17, the first write shield layer 21, the yoke layer 22, the coil 25 and the second write shield layer 28. The coils 10 and 25 generate a magnetic field corresponding to data to be written on the recording medium. The pole layer 14 has an end face located in the medium facing surface 30, allows a magnetic flux corresponding to the magnetic field generated by the coils 10 and 25 to pass, and generates a write magnetic field for writing the data on the recording medium by means of the perpendicular magnetic recording system.

The first write shield layer 21 is made of a ferromagnetic material, and has an end face located in the medium facing surface 30 at a position forward of the end face of the pole layer 14 along the direction T of travel of the recording medium. The gap layer 17 is made of a nonmagnetic insulating material, has an end face located in the medium facing surface 30, and is disposed between the first write shield layer 21 and the pole layer 14. The second write shield layer 28 magnetically connects the first write shield layer 21 and the yoke layer 22 to each other. Part of the coil 25 is disposed to pass through the space surrounded by the pole layer 14, the first write shield layer 21, the yoke layer 22 and the second write shield layer 28. The pole layer 14, the first write shield layer 21, the yoke layer 22 and the second write shield layer 28 form a magnetic path that allows the magnetic flux corresponding to the magnetic field generated by the coil 25 to pass.

In the medium facing surface 30, the end face of the first write shield layer 21 is disposed forward of the end face of the pole layer 14 along the direction T of travel of the recording medium (that is, disposed closer to the air-outflow end of the slider) with a predetermined small distance provided therebetween. The position of the end of a bit pattern to be written on the recording medium is determined by the position of an end of the pole layer 14 closer to the gap layer 17 in the medium facing surface 30. The first write shield layer 21 takes in a portion of magnetic flux that is generated from the end face of the pole layer 14 located in the medium facing surface 30, and thereby steepens the changes in intensity of the write magnetic field. It is thereby possible to improve recording density. Furthermore, the first write shield layer 21 and the second write shield layer 28 take in a disturbance magnetic field applied from outside the magnetic head to the magnetic head. It is thereby possible to prevent erroneous writing on the recording medium caused by the disturbance magnetic field intensively taken into the pole layer 14. The second write shield layer 28 mainly has a function of returning a magnetic flux that has been generated from the end face of the pole layer 14 and has magnetized the recording medium.

The coil 10 is not an essential component of the write head and can be dispensed with. FIG. 1 shows an example in which the yoke layer 22 is disposed on the pole layer 14, that is, disposed forward of the pole layer 14 along the direction T of travel of the recording medium. However, the yoke layer 22 may be disposed below the pole layer 14, that is, disposed backward of the pole layer 14 along the direction T of travel of the recording medium.

Figure 2:
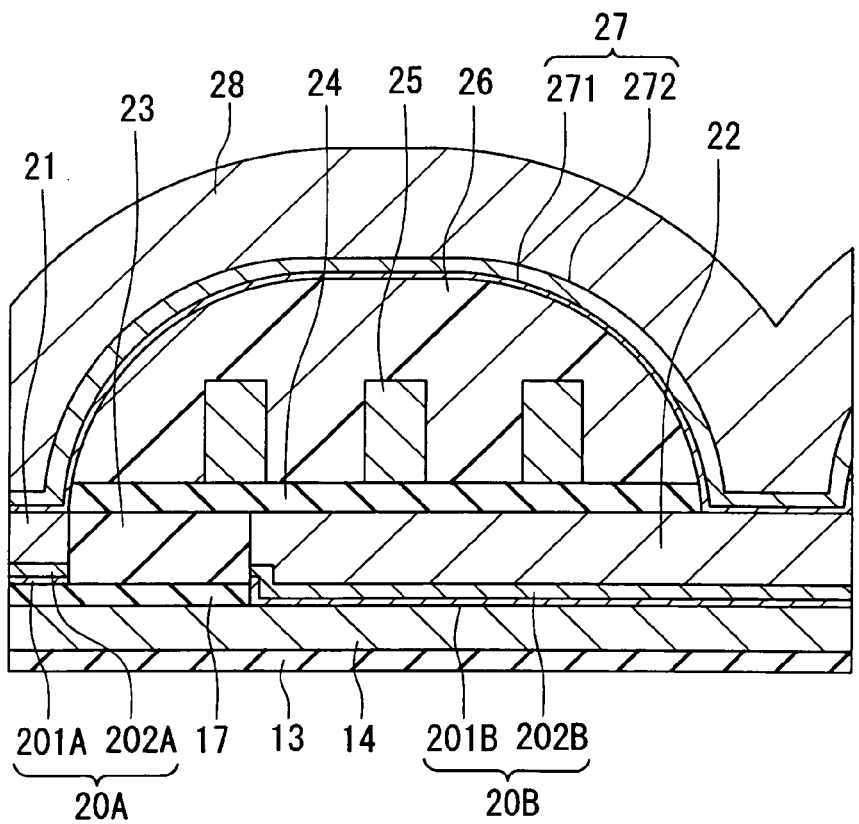
FIG. 2 is a cross-sectional view showing a main part of the magnetic head of FIG. 1.

Reference is now made to FIG. 2 to describe the electrode films 20A, 20B and 27 in detail. FIG. 2 is a cross-sectional view showing a main part of the magnetic head of FIG. 1. As FIG. 2 shows, the electrode film 20A includes a nonmagnetic adhesion layer 201A disposed on the gap layer 17, and a magnetic layer 202A made of a ferromagnetic material and disposed on the nonmagnetic adhesion layer 201A. The electrode film 20B includes a nonmagnetic adhesion layer 201B disposed on the pole layer 14, and a magnetic layer 202B made of a ferromagnetic material and disposed on the nonmagnetic adhesion layer 201B. The electrode film 27 includes: a nonmagnetic adhesion layer 271 disposed on the top surface of the first write shield layer 21, on a portion of the top surface of the yoke layer 22 exposed from the opening of the insulating layer 24, and on a portion of the top surface of the insulating layer 26; and a magnetic layer 272 made of a ferromagnetic material and disposed on the nonmagnetic adhesion layer 271.

Each of the nonmagnetic adhesion layers 201A, 201B and 271 is composed of one element or a plurality of elements selected from the group consisting of Al, Si and nonmagnetic transition metal elements except Ru, and the bond enthalpy of a diatomic molecule composed of an atom of the one element or each of the plurality of elements and an oxygen atom is 400 kJ/mol or higher. Each of the nonmagnetic adhesion layers 201A, 201B and 271 has a thickness within a range of 0.3 to 0.8 nm. Each of the magnetic layers 202A, 202B and 272 contains at least one magnetic element selected from the group consisting of Fe, Co and Ni.

A method of manufacturing the magnetic head of FIG. 1 will now be described with reference to FIG. 3 to FIG. 14. Each of FIG. 3 to FIG. 14 is a cross-sectional view of a stack of layers formed in the process of the manufacture of the magnetic head. Portions closer to the substrate 1 than is the insulating layer 13 are omitted in each of FIG. 3 to FIG. 14.

In the method of manufacturing the magnetic head, first, components of a plurality of magnetic heads are formed on a single substrate to thereby fabricate a substructure in which pre-slider portions each of which will later become a slider are aligned in a plurality of rows. Next, the substructure is cut into a slider aggregate including a plurality of pre-slider portions aligned in a row. Next, a surface formed in the slider aggregate by cutting the substructure is lapped to thereby form the medium facing surfaces 30 of the pre-slider portions included in the slider aggregate. Next, flying rails are formed in the medium facing surfaces 30. Next, the slider aggregate is cut so that the plurality of pre-slider portions are separated from one another, whereby a plurality of sliders are formed, the sliders including their respective magnetic heads.

Attention being drawn to a single magnetic head, the manufacturing method for the magnetic head will now be described. In this method, first formed are the insulating layer 2, the first read shield layer 3 and the first shield gap film 4 in this order on the substrate 1. Next, the MR element 5, the bias magnetic field applying layers and the leads are formed on the first shield gap film 4. Next, the second shield gap film 7 is formed to cover the MR element 5, the bias magnetic field applying layers and the leads. Next, the second read shield layer 8 is formed on the second shield gap film 7. Next, the insulating layer 9 is formed on the second read shield layer 8.

Next, the coil 10 is formed on the insulating layer 9 by, for example, frame plating. Next, the insulating layer 11 is formed so as to be disposed between the respective adjacent turns of the coil 10 and around the coil 10. Next, the insulating layer 12 is formed to cover the coil 10 and the insulating layer 11. Next, the insulating layer 12 is polished by, for example, chemical mechanical polishing (hereinafter referred to as CMP), until the coil 10 becomes exposed, and the top surfaces of the coil 10 and the insulating layers 11 and 12 are thereby planarized. Next, the insulating layer 13 is formed on the coil 10 and the insulating layers 11 and 12.

Figure 3:
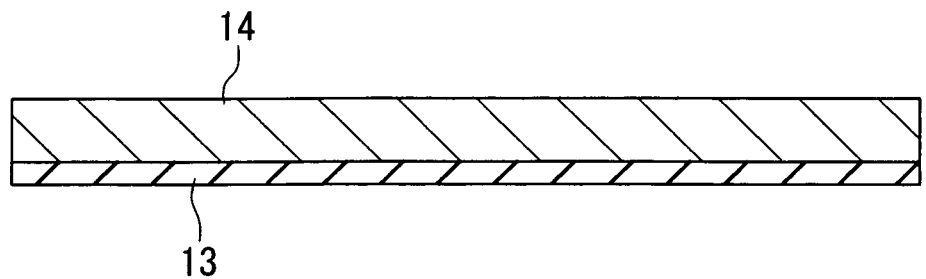
FIG. 3 is a cross-sectional view showing a step of a method of manufacturing the magnetic head of FIG. 1.
Figure 4:
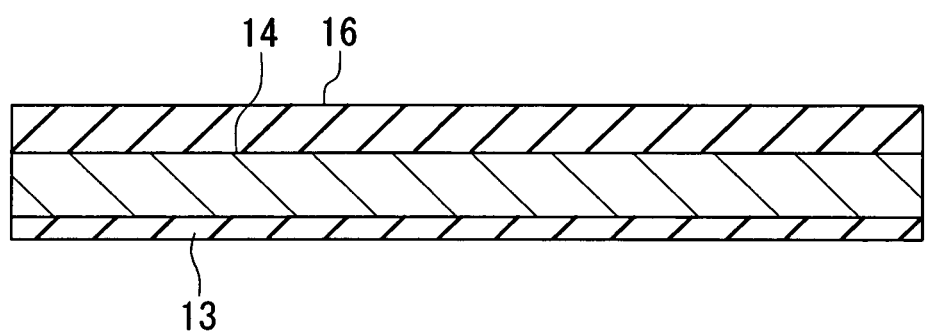
FIG. 4 is a cross-sectional view showing a step that follows the step of FIG. 3.

Next, as shown in FIG. 3, the pole layer 14 is formed on the insulating layer 13 by, for example, frame plating. Furthermore, although not shown in FIG. 3, the connecting layer 15 is formed on the connecting portion 10a of the coil 10. Next, as shown in FIG. 4, the insulating layer 16 is formed to cover the pole layer 14 and the connecting layer 15.

Figure 5:
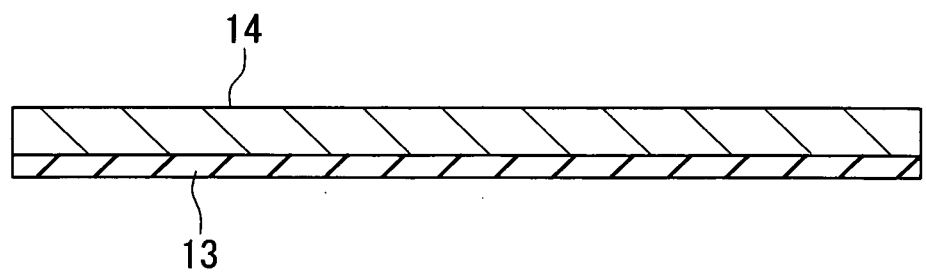
FIG. 5 is a cross-sectional view showing a step that follows the step of FIG. 4.

Next, as shown in FIG. 5, the insulating layer 16 is polished by, for example, CMP, until the pole layer 14 and the connecting layer 15 become exposed, and the top surfaces of the pole layer 14, the connecting layer 15 and the insulating layer 16 are thereby planarized.

Figure 6:
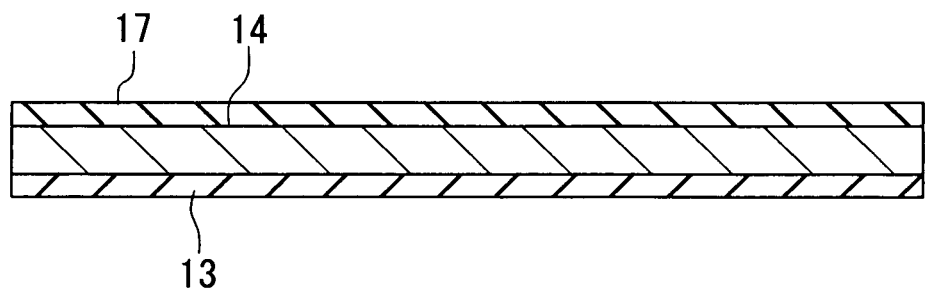
FIG. 6 is a cross-sectional view showing a step that follows the step of FIG. 5.
Figure 7:
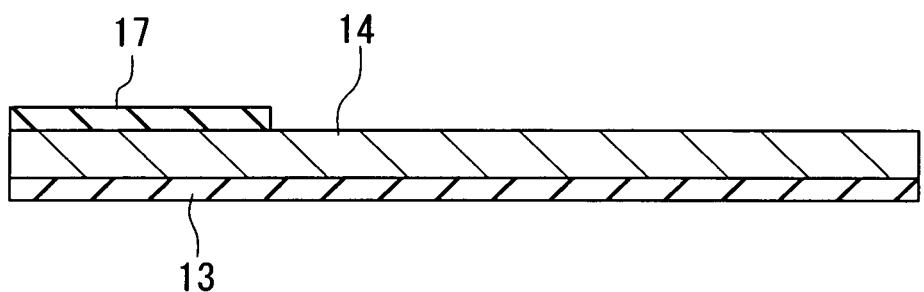
FIG. 7 is a cross-sectional view showing a step that follows the step of FIG. 6.

Next, as shown in FIG. 6, the gap layer 17 is formed over the entire top surface of the stack of FIG. 5. Next, as shown in FIG. 7, a portion of the gap layer 17 is removed by etching such as ion milling. As a result, a portion of the top surface of the pole layer 14 over which the yoke layer 22 will be disposed later is exposed.

Figure 8:
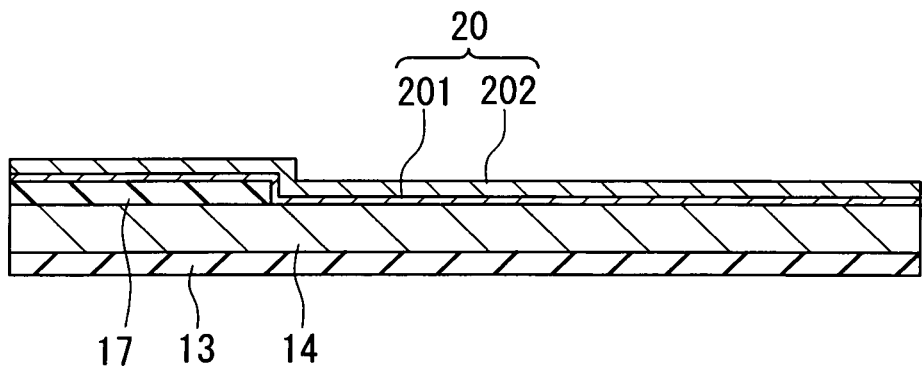
FIG. 8 is a cross-sectional view showing a step that follows the step of FIG. 7.

Next, as shown in FIG. 8, a nonmagnetic adhesion layer 201 and a magnetic layer 202 are formed in this order over the entire top surface of the stack of FIG. 7. The nonmagnetic adhesion layer 201 and the magnetic layer 202 constitute an electrode film 20 for plating. The nonmagnetic adhesion layer 201 will be partially etched later to thereby become the nonmagnetic adhesion layers 201A and 201B. The magnetic layer 202 will be partially etched later to thereby become the magnetic layers 202A and 202B. The nonmagnetic adhesion layer 201 is composed of one element or a plurality of elements selected from the group consisting of Al, Si and nonmagnetic transition metal elements except Ru, and the bond enthalpy of a diatomic molecule composed of an atom of the one element or each of the plurality of elements and an oxygen atom is 400 kJ/mol or higher. The nonmagnetic adhesion layer 201 has a thickness within the range of 0.3 to 0.8 nm. The magnetic layer 202 contains at least one magnetic element selected from the group consisting of Fe, Co and Ni. The nonmagnetic adhesion layer 201 and the magnetic layer 202 are formed successively in a vacuum by sputtering, for example.

Figure 9:
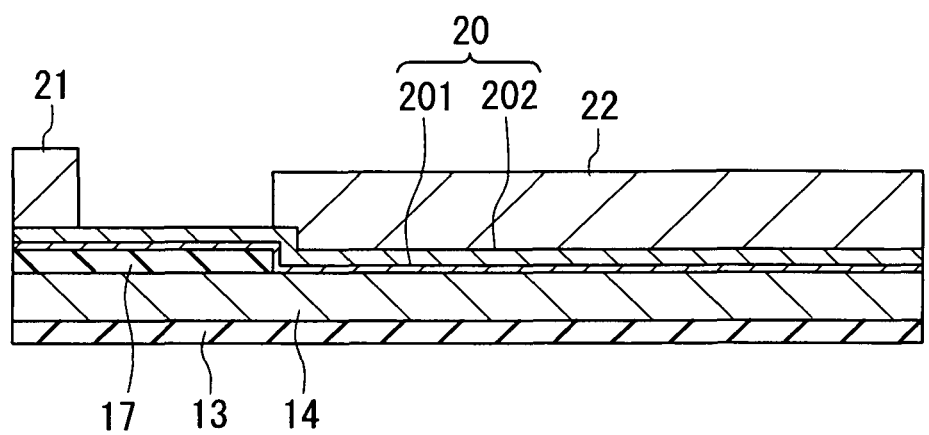
FIG. 9 is a cross-sectional view showing a step that follows the step of FIG. 8.

Next, as shown in FIG. 9, the first write shield layer 21 and the yoke layer 22 are formed on the electrode film 20 by frame plating. Concurrently with this, the connecting layer 18 (not shown in FIG. 9) may be formed through the use of the electrode film 20.

Figure 10:
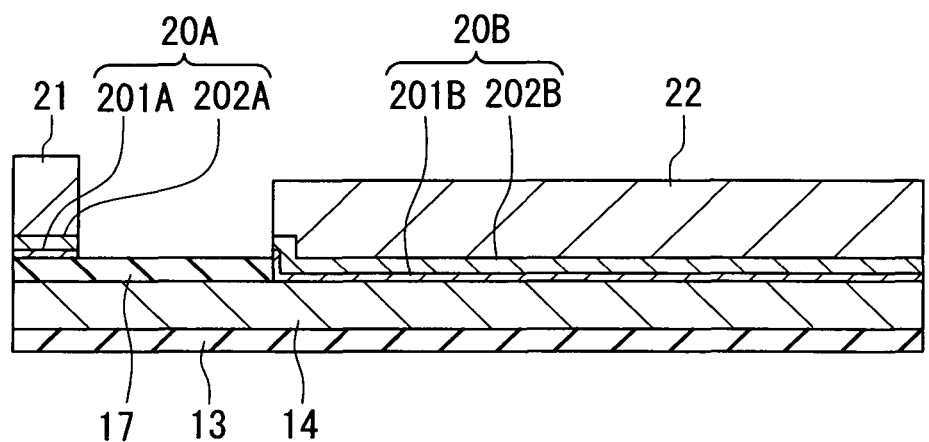
FIG. 10 is a cross-sectional view showing a step that follows the step of FIG. 9.

Next, as shown in FIG. 10, the electrode film 20 except portions thereof located below the first write shield layer 21, the yoke layer 22 and the connecting layer 18 is removed by etching such as ion milling. As a result, the nonmagnetic adhesion layer 201 is divided into the nonmagnetic adhesion layers 201A and 201B, and the magnetic layer 202 is divided into the magnetic layers 202A and 202B. The nonmagnetic adhesion layer 201A and the magnetic layer 202A constitute the electrode film 20A, while the nonmagnetic adhesion layer 201B and the magnetic layer 202B constitute the electrode film 20B.

Figure 11:
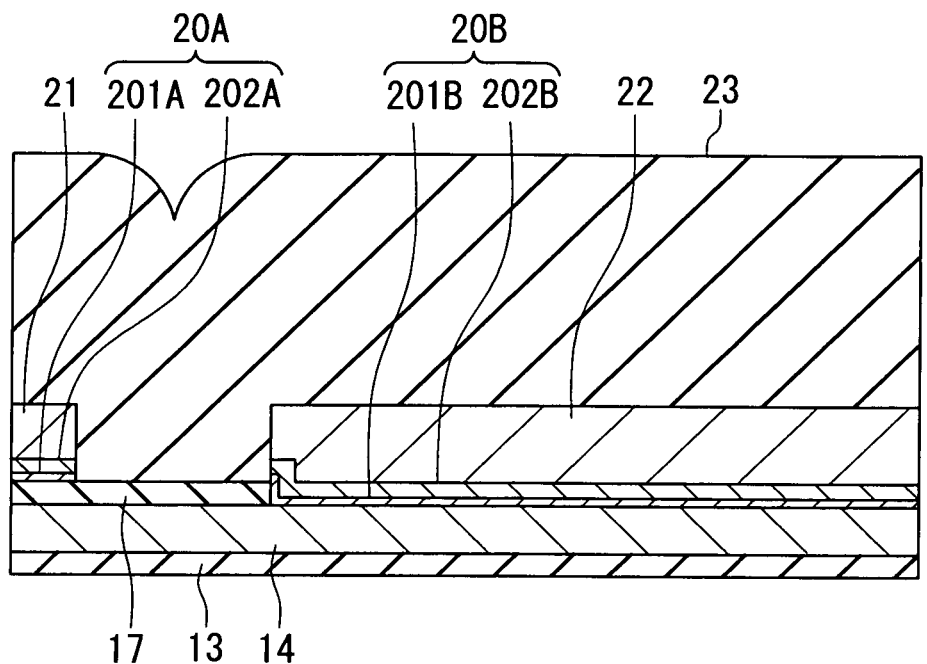
FIG. 11 is a cross-sectional view showing a step that follows the step of FIG. 10.
Figure 12:
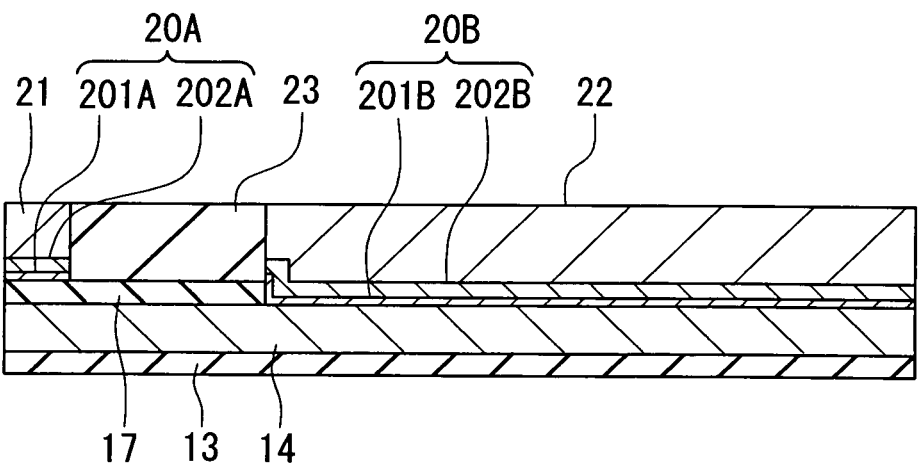
FIG. 12 is a cross-sectional view showing a step that follows the step of FIG. 11.

Next, as shown in FIG. 11, the insulating layer 23 is formed over the entire top surface of the stack of FIG. 10. Next, as shown in FIG. 12, the insulating layer 23 is polished by, for example, CMP, until the connecting layer 18, the first write shield layer 21 and the yoke layer 22 become exposed, and the top surfaces of the connecting layer 18, the first write shield layer 21, the yoke layer 22 and the insulating layer 23 are thereby planarized.

Figure 13:
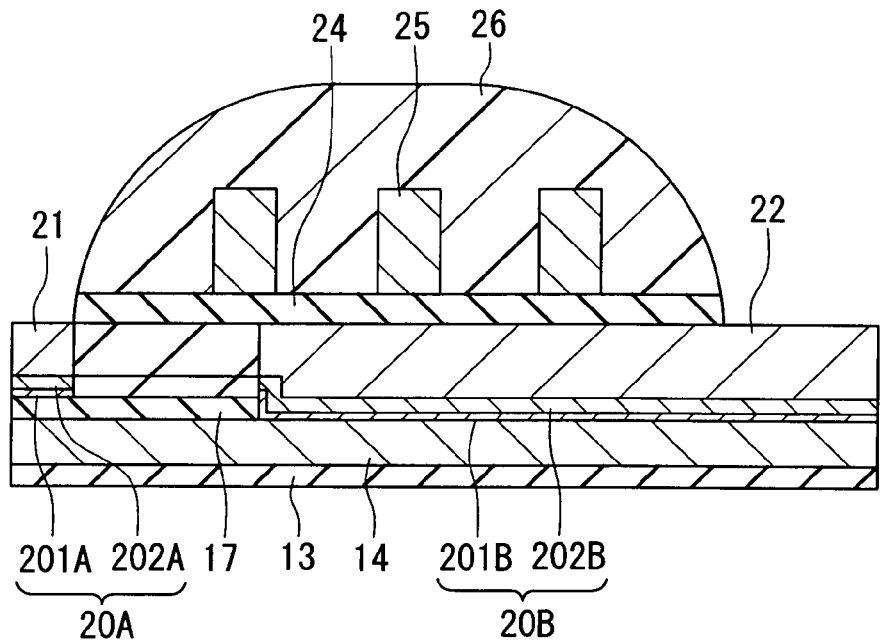
FIG. 13 is a cross-sectional view showing a step that follows the step of FIG. 12.

FIG. 13 shows the next step. In this step, first, the insulating layer 24 is formed over the entire top surface of the stack of FIG. 12. Next, formed in the insulating layer 24 are the opening for exposing the top surface of the first write shield layer 21, the opening for exposing the portion of the top surface of the yoke layer 22 located away from the medium facing surface 30, and the opening for exposing the top surface of the connecting layer 18. Next, the coil 25 is formed on the insulating layer 24. Next, the insulating layer 26 is formed to cover the coil 25.

Figure 14:
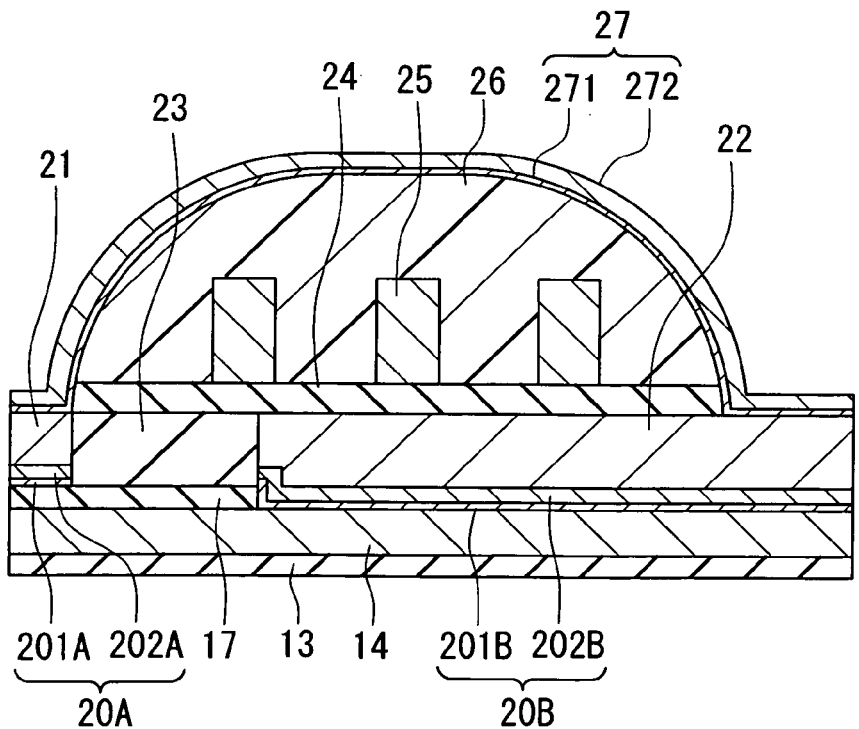
FIG. 14 is a cross-sectional view showing a step that follows the step of FIG. 13.

Next, as shown in FIG. 14, the nonmagnetic adhesion layer 271 and the magnetic layer 272 are formed in this order on the top surface of the first write shield layer 21, on the portion of the top surface of the yoke layer 22 exposed from the opening of the insulating layer 24, and on the portion of the top surface of the insulating layer 26. The nonmagnetic adhesion layer 271 and the magnetic layer 272 constitute the electrode film 27 for plating. The nonmagnetic adhesion layer 271 and the magnetic layer 272 are formed successively in a vacuum by sputtering, for example.

Next, as shown in FIG. 2, the second write shield layer 28 is formed on the electrode film 27 by frame plating. Next, the electrode film 27 except a portion thereof located below the second write shield layer 28 is removed by etching such as ion milling. Next, the overcoat layer 29 is formed as shown in FIG. 1. Wiring, terminals and so on are then formed on the overcoat layer 29. The substructure is thus fabricated.

The functions and effects of the electrode films 20, 20A, 20B and 27 will now be described in detail. According to the present embodiment, in the step shown in FIG. 8 the electrode film 20 is formed on the top surface of the pole layer 14, which is a magnetic layer, and on the top surface of the gap layer 17 made of a nonmagnetic insulating material such as alumina. Subsequently, in the step shown in FIG. 9 the first write shield layer 21 and the yoke layer 22 are formed on the electrode film 20 by plating. The pole layer 14 corresponds to the first magnetic layer of the present invention, and the gap layer 17 corresponds to the nonmagnetic insulating layer of the present invention. The gap layer 17 that is made of, for example, alumina, contains an oxygen atom. The gap layer 17 is disposed to cover a portion of the top surface of the pole layer 14. The electrode film 20 includes the nonmagnetic adhesion layer 201 disposed on the top surfaces of the gap layer 17 and the pole layer 14, and the magnetic layer 202 disposed on the nonmagnetic adhesion layer 201. The magnetic layer 202 corresponds to the second magnetic layer of the present invention. The pole layer 14, the gap layer 17, the nonmagnetic adhesion layer 201 and the magnetic layer 202 correspond to the magnetic structure of the present invention. The first write shield layer 21 and the yoke layer 22 correspond to the third magnetic layer of the present invention.

As will be described in detail later, the nonmagnetic adhesion layer 201 exhibits higher adhesion to the gap layer 17, which is a nonmagnetic insulating layer, than does an electrode film made of a magnetic material. The nonmagnetic adhesion layer 201 also exhibits high adhesion to the pole layer 14. Consequently, the electrode film 20 according to the present embodiment is capable of providing higher adhesion to the top surfaces of the pole layer 14 and the gap layer 17, compared with an electrode film made of a magnetic material. As will also be described in detail later, the feature that the nonmagnetic adhesion layer 201 has a thickness within the range of 0.3 to 0.8 nm serves to establish ferromagnetic coupling between the pole layer 14 and the magnetic layer 202, which are adjacent to each other with the nonmagnetic adhesion layer 201 disposed therebetween. As a result, ferromagnetic coupling is also established between the pole layer 14 and the yoke layer 22 that is formed on the electrode film 20. The electrode film 20 is etched in the step shown in FIG. 10 and thereby becomes the electrode films 20A and 20B. For the reasons described above, the electrode film 20A exhibits high adhesion to the top surface of the gap layer 17, and the electrode film 20B exhibits high adhesion to the pole layer 14.

According to the present embodiment, in the step shown in FIG. 14, the electrode film 27 is formed on the top surfaces of the first write shield layer 21 and the yoke layer 22, each of which is a magnetic layer, and on the top surface of the insulating layer 26 made of a nonmagnetic insulating material such as a thermosetting resin. Subsequently, as shown in FIG. 2, the second write shield layer 28 is formed on the electrode film 27 by plating. The first write shield layer 21 and the yoke layer 22 each correspond to the first magnetic layer of the present invention, and the insulating layer 26 corresponds to the nonmagnetic insulating layer of the present invention. The insulating layer 26 that is made of, for example, a thermosetting resin, contains an oxygen atom. Note that almost all typical thermosetting resins contain oxygen atoms. The insulating layer 26 is adjacent to the first write shield layer 21 without overlapping the top surface of the first write shield layer 21. Furthermore, the insulating layer 26 is disposed to cover a portion of the top surface of the yoke layer 22. The electrode film 27 includes the nonmagnetic adhesion layer 271 disposed on the top surfaces of the first write shield layer 21, the yoke layer 22 and the insulating layer 26, and the magnetic layer 272 disposed on the nonmagnetic adhesion layer 271. The magnetic layer 272 corresponds to the second magnetic layer of the present invention. The first write shield layer 21, the yoke layer 22, the insulating layers 23 and 24, the coil 25, the insulating layer 26, the nonmagnetic adhesion layer 271 and the magnetic layer 272 correspond to the magnetic structure of the present invention. The second write shield layer 28 corresponds to the third magnetic layer of the present invention.

As will be described in detail later, the nonmagnetic adhesion layer 271 exhibits higher adhesion to the insulating layer 26, which is a nonmagnetic insulating layer, than does an electrode film made of a magnetic material. The nonmagnetic adhesion layer 271 also exhibits high adhesion to the first write shield layer 21 and the yoke layer 22. Consequently, the electrode film 27 according to the present embodiment is capable of providing higher adhesion to the top surfaces of the first write shield layer 21, the yoke layer 22 and the insulating layer 26, compared with an electrode film made of a magnetic material. As will also be described in detail later, the feature that the nonmagnetic adhesion layer 271 has a thickness within the range of 0.3 to 0.8 nm serves to establish ferromagnetic coupling between the first write shield layer 21 and the magnetic layer 272, which are adjacent to each other with the nonmagnetic adhesion layer 271 disposed therebetween, and also serves to establish ferromagnetic coupling between the yoke layer 22 and the magnetic layer 272, which are adjacent to each other with the nonmagnetic adhesion layer 271 disposed therebetween. As a result, ferromagnetic coupling is also established between the first write shield layer 21 and the second write shield layer 28 that is formed on the electrode film 27, and also between the yoke layer 22 and the second write shield layer 28.

A description will now be made on the reason why the nonmagnetic adhesion layer (201, 271) exhibits higher adhesion to the nonmagnetic insulating layer than does an electrode film made of a magnetic material. The nonmagnetic adhesion layer of the present embodiment is composed of one element or a plurality of elements selected from the group consisting of Al, Si and nonmagnetic transition metal elements except Ru, and the bond enthalpy of a diatomic molecule composed of an atom of the one element or each of the plurality of elements and an oxygen atom is 400 kJ/mol or higher.

Table 1 below shows the bond enthalpy of a diatomic molecule composed of an atom of each of Al, Si and transition metal elements and an oxygen atom. All values are in kJ/mol.

TABLE 1

| Sc | Ti | V | Cr | Mn | Fe | Co | Ni | Al 511.0 Cu | Si 799.6 Zn |
|---|---|---|---|---|---|---|---|---|---|
| 681.6 | 672.4 | 626.8 | 429.3 | 402.9 | 390.4 | 384.5 | 382.0 | 269.0 | 159.0 |
| Y | Zr | Nb | Mo | Tc | Ru | Rh | Pd | Ag | Cd |

TABLE 1-continued

| 719.6 | 776.1 | 771.5 | 560.2 | | 528.4 | 405.0 | 380.7 | 220.1 | 235.6 |
|---|---|---|---|---|---|---|---|---|---|
| Hf | Ta | W | Re | Os | Ir | Pt | Au | Hg | |
| 801.7 | 799.1 | 672.0 | 626.8 | 575.0 | 414.6 | 391.6 | 221.8 | 220.9 | |

The bond enthalpy of a diatomic molecule corresponds to the magnitude of bonding strength between the two atoms constituting the diatomic molecule. As Table 1 shows, the bond enthalpy of a diatomic molecule composed of an atom of any of Fe, Co and Ni, which are magnetic elements, and an oxygen atom, is lower than 400 kJ/mol. As described above, the bond enthalpy of a diatomic molecule composed of an atom of a constituent element of the nonmagnetic adhesion layer and an oxygen atom is 400 kJ/mol or higher. This means that the bonding strength between an atom of the constituent element of the nonmagnetic adhesion layer and an oxygen atom is higher than the bonding strength between an atom of a magnetic element and an oxygen atom. The nonmagnetic insulating layer contains an oxygen atom. Because of the foregoing, the nonmagnetic adhesion layer of the present embodiment exhibits higher adhesion to the nonmagnetic insulating layer containing an oxygen atom, than does an electrode film made of a magnetic material.

When a magnetic layer is formed over an insulating layer or a substrate, an adhesion layer is typically formed on the insulating layer or the substrate before forming the magnetic layer so as to enhance adhesion between the insulating layer or the substrate and the magnetic layer. Al, Si, and nonmagnetic metal elements such as Cr, Ti, Ta, W, Hf, Zr and Nb are often used as the material of such an adhesion layer. Each of these elements is, as Table 1 shows, such an element that the bond enthalpy of a diatomic molecule composed of an atom of the element and an oxygen atom is 400 kJ/mol or higher.

For the foregoing reasons, the nonmagnetic adhesion layer of the present embodiment exhibits higher adhesion to the nonmagnetic insulating layer containing an oxygen atom, than does an electrode film made of a magnetic material. Each of the elements that can constitute this nonmagnetic adhesion layer is an element that forms a solid solution with each of Fe, Co and Ni, which can be the constituent element(s) of the first magnetic layer (the pole layer 14, the first write shield layer 21, the yoke layer 22). Consequently, the nonmagnetic adhesion layer of the present embodiment also exhibits high adhesion to the first magnetic layer.

Next, a description will be made on the reason why the feature that the nonmagnetic adhesion layer (201, 271) has a thickness within the range of 0.3 to 0.8 nm in the electrode film (20, 27) serves to establish ferromagnetic coupling between the first magnetic layer (the pole layer 14, the first write shield layer 21, the yoke layer 22) and the second magnetic layer (202, 272), which are adjacent to each other with the nonmagnetic adhesion layer (201, 271) disposed therebetween. If the nonmagnetic adhesion layer is made extremely small in thickness such as 0.3 to 0.8 nm, with respect to the total of magnetic element atoms present in the electrode film, there occurs an increase in proportion of those coming into contact with magnetic element atoms constituting the first magnetic layer located below the electrode film and thereby having an exchange interaction with those atoms with a positive exchange integral. As a result, ferromagnetic coupling occurs between the first magnetic layer and the second magnetic layer. This ferromagnetic coupling has coupling energy $10^3$ to $10^5$ times higher than that of magnetostatic coupling arising from a magnetic dipolar interaction.

It should be noted that, when a Ru layer is provided between the first magnetic layer and the second magnetic layer, an antiferromagnetic interaction resulting from the RKKY interaction can occur, depending on the thickness of the Ru layer. An observation of the relationship between the thickness of the Ru layer and the magnitude of the antiferromagnetic interaction resulting from the RKKY interaction indicates that peaks of the antiferromagnetic interaction resulting from the RKKY interaction exist around a 0.3-nm thickness and a 0.8-nm thickness of the Ru layer. Thus, when a Ru layer is provided between the first magnetic layer and the second magnetic layer, there are cases in which ferromagnetic coupling between the first magnetic layer and the second magnetic layer cannot be established, depending on the conditions of the Ru layer such as the formation method and thickness. This is why the present invention excludes Ru from the elements that can constitute the nonmagnetic adhesion layer.

Furthermore, from the experimental results shown later, it was found that the adhesion of the nonmagnetic adhesion layer to the first magnetic layer and the nonmagnetic insulating layer obtained when the thickness of the nonmagnetic adhesion layer was within the range of 0.3 to 0.8 nm was almost equal to that obtained when the thickness of the nonmagnetic adhesion layer was 5 nm. Consequently, making the thickness of the nonmagnetic adhesion layer fall within the range of 0.3 to 0.8 nm serves to ensure adhesion of the nonmagnetic adhesion layer to the first magnetic layer and the nonmagnetic insulating layer, and also to establish ferromagnetic coupling between the first magnetic layer and the second magnetic layer.

When the nonmagnetic adhesion layer is formed by, for example, sputtering, atoms constituting the nonmagnetic adhesion layer can be implanted or thermally diffused into the first magnetic layer, and as a result, in the vicinity of the interface between the nonmagnetic adhesion layer and the first magnetic layer, there can be formed a region in which the concentration of the atoms constituting the nonmagnetic adhesion layer changes such that it decreases with increasing distance from the nonmagnetic adhesion layer. The gentler is the gradient of the concentration changes of the atoms constituting the nonmagnetic adhesion layer in this region, the higher is the proportion of the magnetic element atoms in the electrode film which come into contact with the magnetic element atoms constituting the first magnetic layer. As a result, ferromagnetic coupling between the first magnetic layer and the second magnetic layer becomes easier. Furthermore, the gentler is the gradient of the foregoing concentration changes, the higher is the entropy. As a result, the interfacial energy at the interface between the nonmagnetic adhesion layer and the first magnetic layer decreases, so that the adhesion of the nonmagnetic adhesion layer to the first magnetic layer increases.

As described thus far, the present embodiment makes it possible to ensure adhesion of the nonmagnetic adhesion layer to the first magnetic layer and the nonmagnetic insulating layer, and to establish ferromagnetic coupling between the first magnetic layer and the second magnetic layer. Furthermore, according to the present embodiment, forming a third magnetic layer on the second magnetic layer makes it possible to ferromagnetically couple the first to third magnetic layers to one another. As a result, when the first to third magnetic layers form a magnetic path for passing a magnetic flux corresponding to the magnetic field generated by the coil in the write head of the magnetic head, it is possible to prevent the occurrence of problems such as a reduction in write magnetic field due to the presence of the nonmagnetic adhesion layer and erroneous writing or erasure of data on the recording medium. Consequently, the present embodiment makes it possible to improve the performance of the write head. To be specific, the embodiment makes it possible to improve the overwrite property and to prevent erroneous writing or erasure of data on the recording medium. As a result, according to the embodiment, it is possible to provide a magnetic read/write apparatus with higher recording density.

Furthermore, according to the embodiment, the improved adhesion of the electrode film to the first magnetic layer and the nonmagnetic insulating layer leads to higher yields of the manufacture of the magnetic head, higher design flexibility of the manufacturing steps of the magnetic head, and higher reliability of the magnetic read/write apparatus.

Furthermore, according to the embodiment, forming the nonmagnetic adhesion layer and the second magnetic layer successively in a vacuum serves to improve the adhesion between the nonmagnetic adhesion layer and the second magnetic layer.

Figure 15:
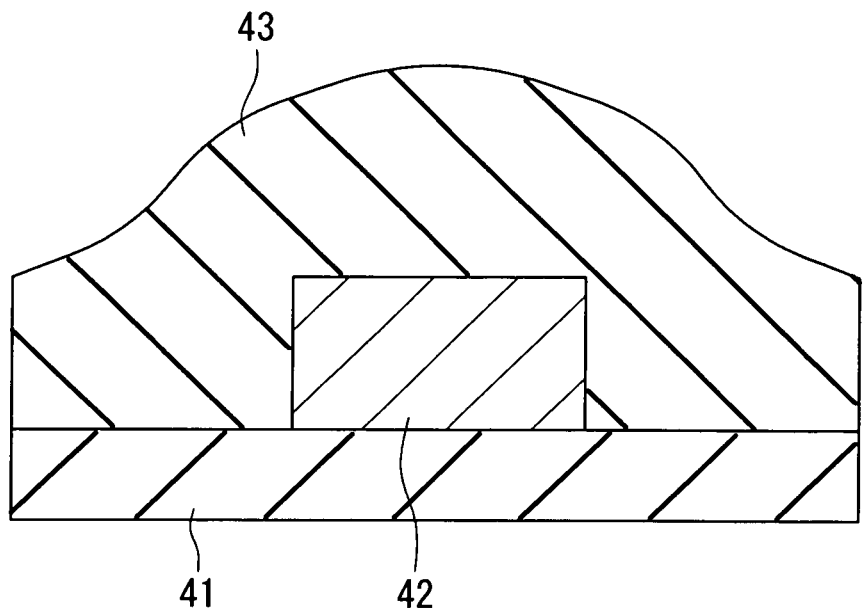
FIG. 15 is a cross-sectional view showing a step of another example of method of manufacturing a magnetic structure of the invention.

Reference is now made to FIG. 15 to FIG. 18 to describe another example of the magnetic structure of the present invention and the method of manufacturing the same. Each of FIG. 15 to FIG. 18 is a cross-sectional view of a stack of layers formed in the process of the manufacture of the magnetic structure. In the manufacturing method for this magnetic structure, first, as shown in FIG. 15, a magnetic layer 42 having a predetermined shape is formed on a nonmagnetic insulating layer 41 that is made of, for example, alumina, and then a nonmagnetic insulating layer 43 made of, for example, alumina, is formed on the nonmagnetic insulating layer 41 and the magnetic layer 42 such that the magnetic layer 42 is covered.

Figure 16:
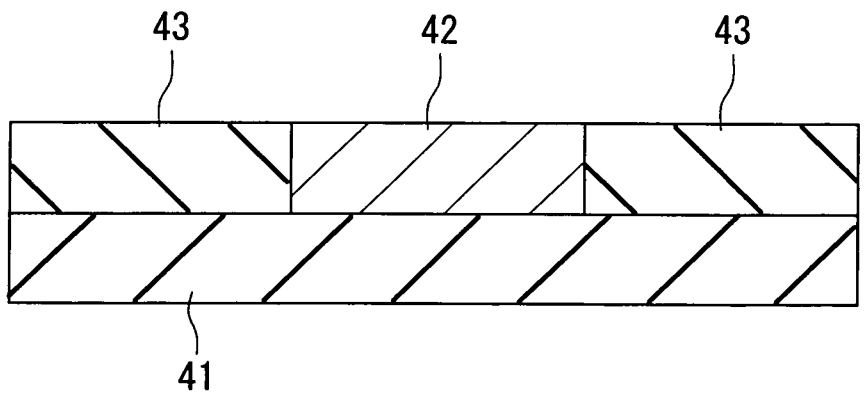
FIG. 16 is a cross-sectional view showing a step that follows the step of FIG. 15.

Next, as shown in FIG. 16, the nonmagnetic insulating layer 43 is polished by, for example, CMP, until the magnetic layer 42 becomes exposed, and the top surfaces of the magnetic layer 42 and the nonmagnetic insulating layer 43 are thereby planarized. As a result, the nonmagnetic insulating layer 43 lies adjacent to the magnetic layer 42 without overlapping the top surface of the magnetic layer 42. The magnetic layer 42 corresponds to the first magnetic layer of the present invention.

Figure 17:
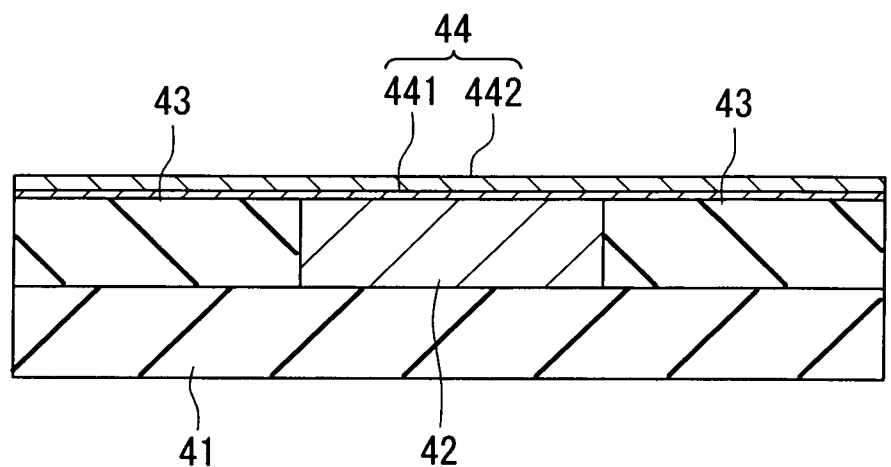
FIG. 17 is a cross-sectional view showing a step that follows the step of FIG. 16.

Next, as shown in FIG. 17, a nonmagnetic adhesion layer 441 and a magnetic layer 442 are formed in this order on the top surfaces of the magnetic layer 42 and the nonmagnetic insulating layer 43. The nonmagnetic adhesion layer 441 and the magnetic layer 442 constitute an electrode film 44 for plating. The nonmagnetic adhesion layer 441 is composed of one element or a plurality of elements selected from the group consisting of Al, Si and nonmagnetic transition metal elements except Ru, and the bond enthalpy of a diatomic molecule composed of an atom of the one element or each of the plurality of elements and an oxygen atom is 400 kJ/mol or higher. The nonmagnetic adhesion layer 441 has a thickness within the range of 0.3 to 0.8 nm. The magnetic layer 442 contains at least one magnetic element selected from the group consisting of Fe, Co and Ni. The nonmagnetic adhesion layer 441 and the magnetic layer 442 are formed successively in a vacuum by sputtering, for example. The magnetic layer 442 corresponds to the second magnetic layer of the present invention. The magnetic layer 42, the nonmagnetic insulating layer 43, the nonmagnetic adhesion layer 441 and the magnetic layer 442 correspond to the magnetic structure of the present invention.

Figure 18:
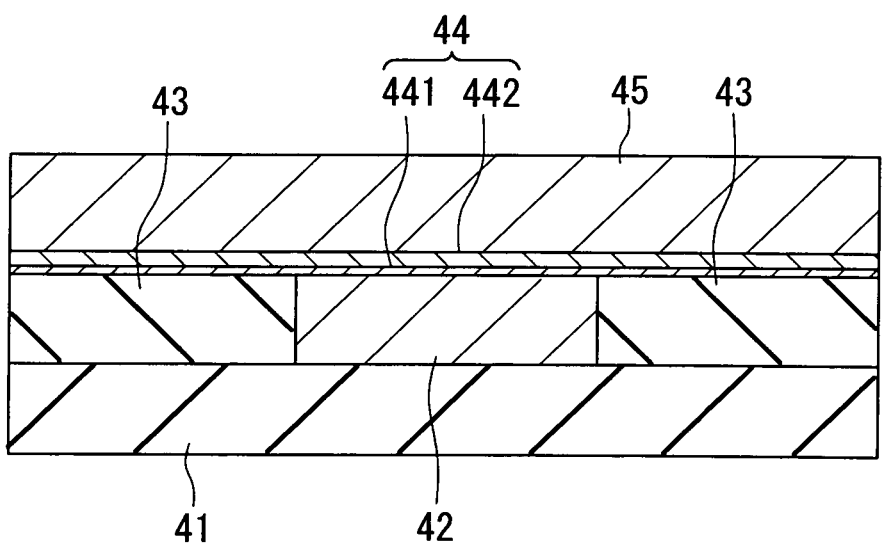
FIG. 18 is a cross-sectional view showing a step that follows the step of FIG. 17.

Next, as shown in FIG. 18, a magnetic layer 45 is formed by plating on the electrode film 44. The magnetic layer 45 corresponds to the third magnetic layer of the present invention.

According to this example, it is possible to ensure adhesion of the nonmagnetic adhesion layer 441 to the magnetic layer 42 and the nonmagnetic insulating layer 43, and also possible to establish ferromagnetic coupling between the magnetic layer 42 and the magnetic layer 442. Furthermore, according to this example, it is possible to establish ferromagnetic coupling among the magnetic layers 42, 442 and 45.

The magnetic structure shown in FIG. 18 is used in a case where a yoke layer to be connected to a pole layer is disposed below the pole layer in a magnetic head. In this case, specifically, the magnetic layer 42 serves as the yoke layer and the magnetic layer 45 serves as the pole layer.

[First Experiment]

A description will now be given on the results of a first experiment performed to study the thickness range of the nonmagnetic adhesion layer that permits ferromagnetic coupling between the first magnetic layer and the second magnetic layer that are adjacent to each other with the nonmagnetic adhesion layer disposed therebetween.

Figure 19:
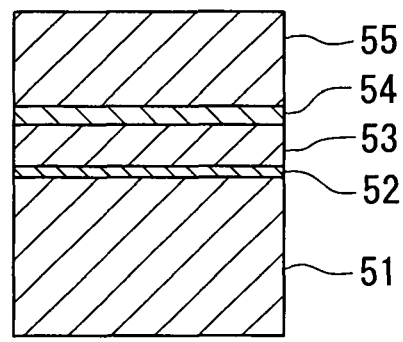
FIG. 19 is a cross-sectional view showing the configuration of samples prepared in a first experiment.

A plurality of samples having the configuration shown in FIG. 19 were prepared for the first experiment. Each of the samples were formed by stacking a 0.8-nm-thick Ru layer 52, a magnetic layer 53, a nonmagnetic adhesion layer 54 and a magnetic layer 55 in this order on a magnetic layer 51. The magnetic layers 51 and 53 are antiferromagnetically coupled to each other by means of the RKKY interaction via the Ru layer 52. The nonmagnetic adhesion layer 54 is made of Ti or Cr. The thickness of the nonmagnetic adhesion layer 54 varies among the samples. The magnetic layers 53 and 55 are ferromagnetically coupled to each other in some cases, and are not in other cases, depending on the thickness of the nonmagnetic adhesion layer 54. Letting M1, M2 and M3 be the values of the product of the saturation magnetization and the volume for the magnetic layers 51, 53 and 55, respectively, the ratio among M1, M2 and M3 is approximately 5:1:2. For the first experiment, also prepared were a plurality of samples without the nonmagnetic adhesion layer 54 of the configuration of FIG. 19, in each of which the magnetic layer 55 was formed on the magnetic layer 53.

In the first experiment, magnetization curves were investigated for the plurality of samples prepared. The magnetization curves are greatly different in shape between the case in which the magnetic layers 53 and 55 are not ferromagnetically coupled to each other and the case in which the magnetic layers 53 and 55 are ferromagnetically coupled to each other.

Figure 20:
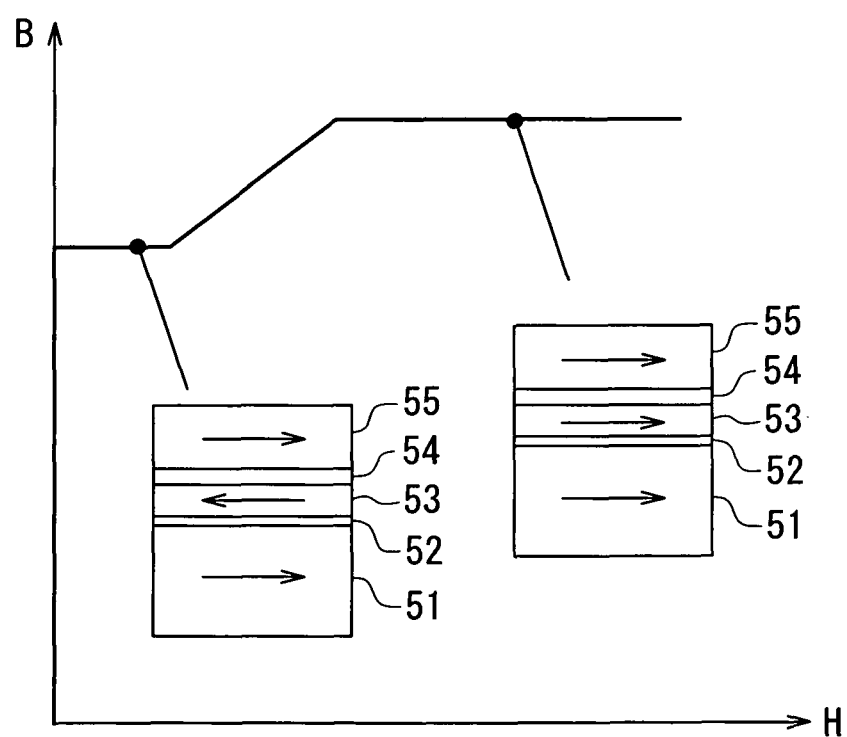
FIG. 20 is an illustrative view showing a shape of a magnetization curve for a sample prepared in the first experiment.

FIG. 20 is an illustrative view that conceptually shows the magnetization curve for the case in which the magnetic layers 53 and 55 are not ferromagnetically coupled to each other. In FIG. 20 the horizontal axis represents the external magnetic field H, while the vertical axis represents the flux density B of the sample. In the case in which the magnetic layers 53 and 55 are not ferromagnetically coupled to each other, as shown in FIG. 20, as the external magnetic field H is increased from zero, the directions of magnetizations of the magnetic layers 51 and 55 become the same as the direction of the external magnetic field H when the external magnetic field H becomes equal to or higher than the coercivities of the magnetic layers 51 and 55. The direction of magnetization of the magnetic layer 53 in this stage is opposite to that of the magnetic layer 51. When the external magnetic field H is further increased to reach magnitude great enough to cancel the antiferromagnetic interaction between the magnetic layers 51 and 53, the direction of magnetization of the magnetic layer 53 also becomes the same as the direction of the external magnetic field H. Because the directions of magnetizations of the magnetic layers 51, 53 and 55 change in the above-described manner, the magnetization curve for the case in which the magnetic layers 53 and 55 are not ferromagnetically coupled to each other is such one shown in FIG. 20.

Figure 21:
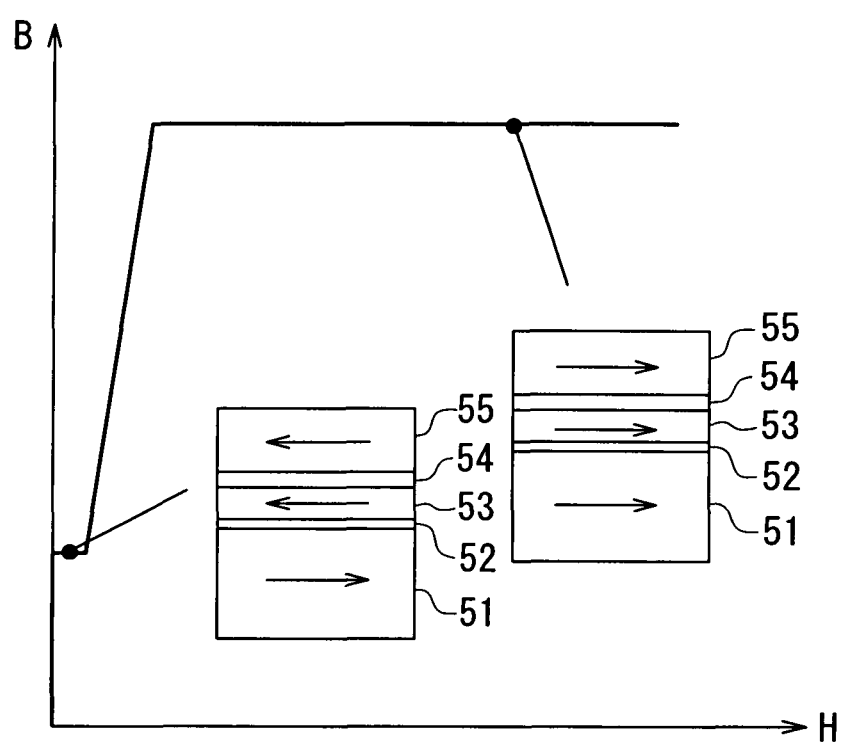
FIG. 21 is an illustrative view showing another shape of a magnetization curve for a sample prepared in the first experiment.

FIG. 21 is an illustrative view that conceptually shows the magnetization curve for the case in which the magnetic layers 53 and 55 are ferromagnetically coupled to each other. In FIG. 21 the horizontal axis represents the external magnetic field H, while the vertical axis represents the flux density B of the sample. In the case in which the magnetic layers 53 and 55 are ferromagnetically coupled to each other, as shown in FIG. 21, as the external magnetic field H is increased from zero, the direction of magnetization of the magnetic layer 51 becomes the same as the direction of the external magnetic field H when the external magnetic field H becomes equal to or higher than the coercivity of the magnetic layer 51. In this stage, the direction of magnetization of the magnetic layer 53 is opposite to that of the magnetic layer 51, and the direction of magnetization of the magnetic layer 55, which is ferromagnetically coupled to the magnetic layer 53, is also opposite to the direction of magnetization of the magnetic layer 51. When the external magnetic field H is further increased to reach magnitude great enough to cancel the antiferromagnetic interaction between the magnetic layers 51 and 53, the directions of magnetizations of the magnetic layers 53 and 55 also become the same as the direction of the external magnetic field H. Because the directions of magnetizations of the magnetic layers 51, 53 and 55 change in the above-described manner, the magnetization curve for the case in which the magnetic layers 53 and 55 are ferromagnetically coupled to each other is such one shown in FIG. 21.

FIG. 22 to FIG. 32 show the magnetization curves for the plurality of samples prepared for the first experiment. The horizontal axis in each of FIG. 22 to FIG. 32 represents the external magnetic field H expressed in the unit Oe (1 Oe=79.6 A/m). The vertical axis in each of FIG. 22 to FIG. 32 represents the flux density B expressed in the unit T (tesla).

Figure 22:
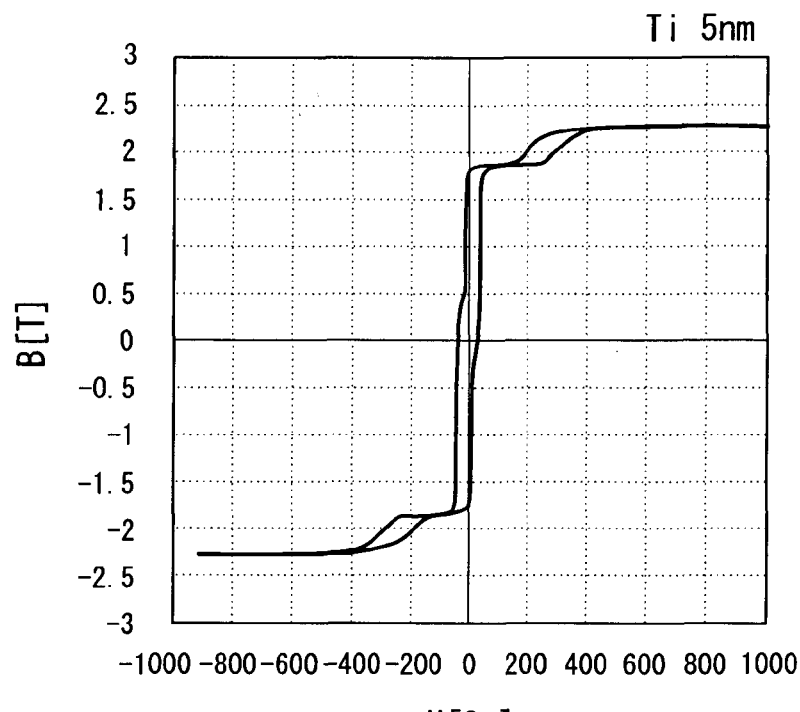
FIG. 22 is a plot showing the magnetization curve for a sample of the first experiment in which the nonmagnetic adhesion layer is a 5-nm-thick Ti layer.

FIG. 22 shows the magnetization curve for a sample in which the nonmagnetic adhesion layer 54 is made of Ti and 5 nm thick. The shape of this magnetization curve indicates that the magnetic layers 53 and 55 of this sample are not ferromagnetically coupled to each other.

Figure 23:
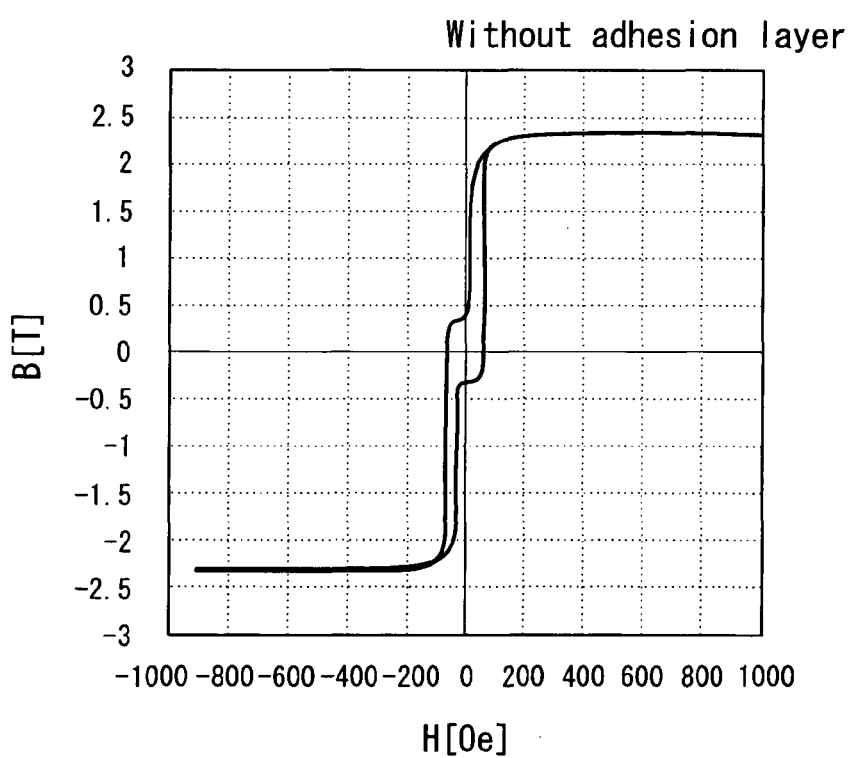
FIG. 23 is a plot showing the magnetization curve for a sample of the first experiment without the nonmagnetic adhesion layer.

FIG. 23 shows the magnetization curve for a sample without the nonmagnetic adhesion layer 54. The shape of this magnetization curve indicates that the magnetic layers 53 and 55 of this sample are ferromagnetically coupled to each other.

Figure 24:
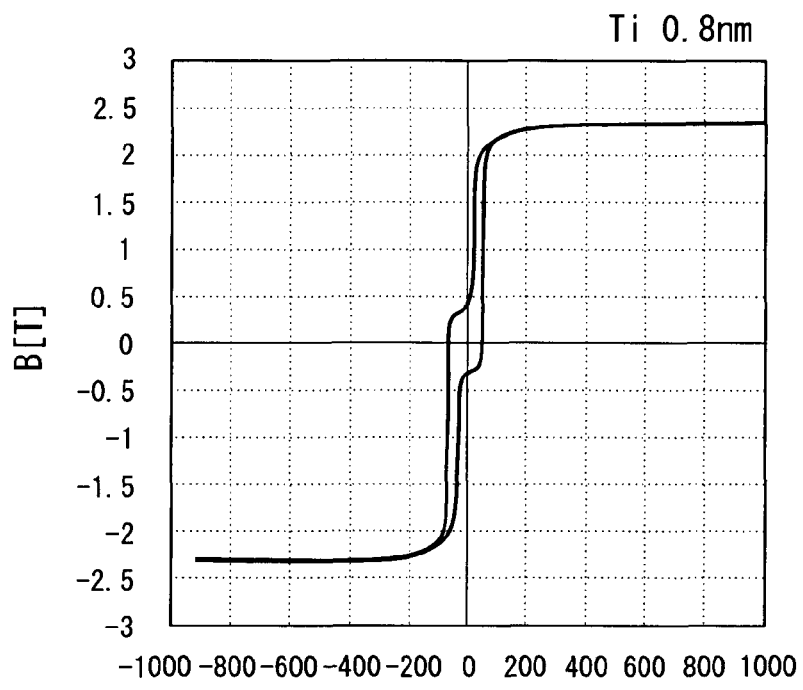
FIG. 24 is a plot showing the magnetization curve for a sample of the first experiment in which the nonmagnetic adhesion layer is a 0.8-nm-thick Ti layer.

FIG. 24 shows the magnetization curve for a sample in which the nonmagnetic adhesion layer 54 is made of Ti and 0.8 nm thick. The shape of this magnetization curve indicates that the magnetic layers 53 and 55 of this sample are ferromagnetically coupled to each other.

Figure 25:
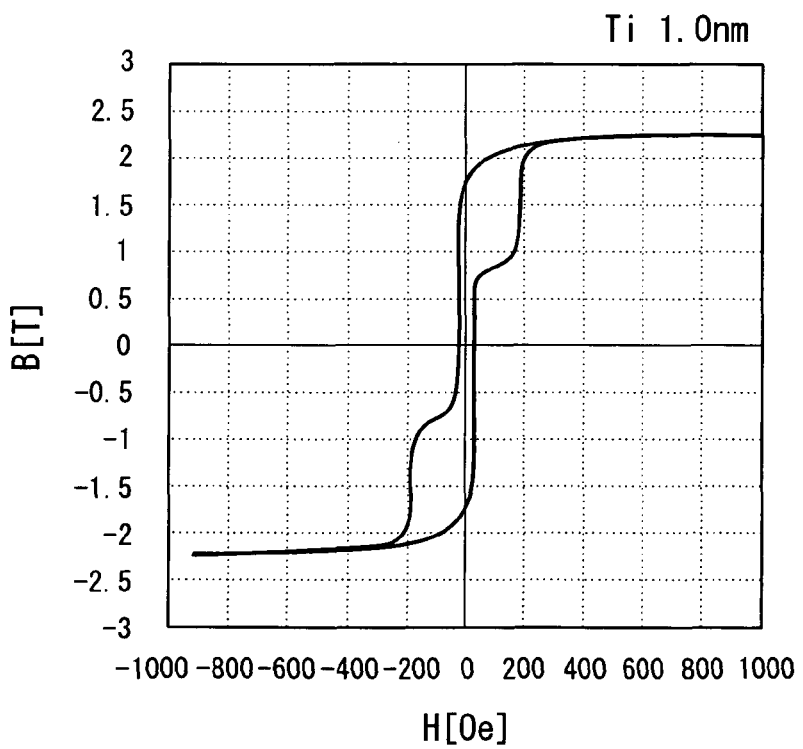
FIG. 25 is a plot showing the magnetization curve for a sample of the first experiment in which the nonmagnetic adhesion layer is a 1.0-nm-thick Ti layer.

FIG. 25 shows the magnetization curve for a sample in which the nonmagnetic adhesion layer 54 is made of Ti and 1.0 nm thick. It appears that the shape of this magnetization curve is a combination of the shape shown in FIG. 20 and the shape shown in FIG. 21. It is therefore considered that this sample includes both of a portion in which the magnetic layers 53 and 55 are ferromagnetically coupled to each other and a portion in which they are not ferromagnetically coupled to each other.

Figure 26:
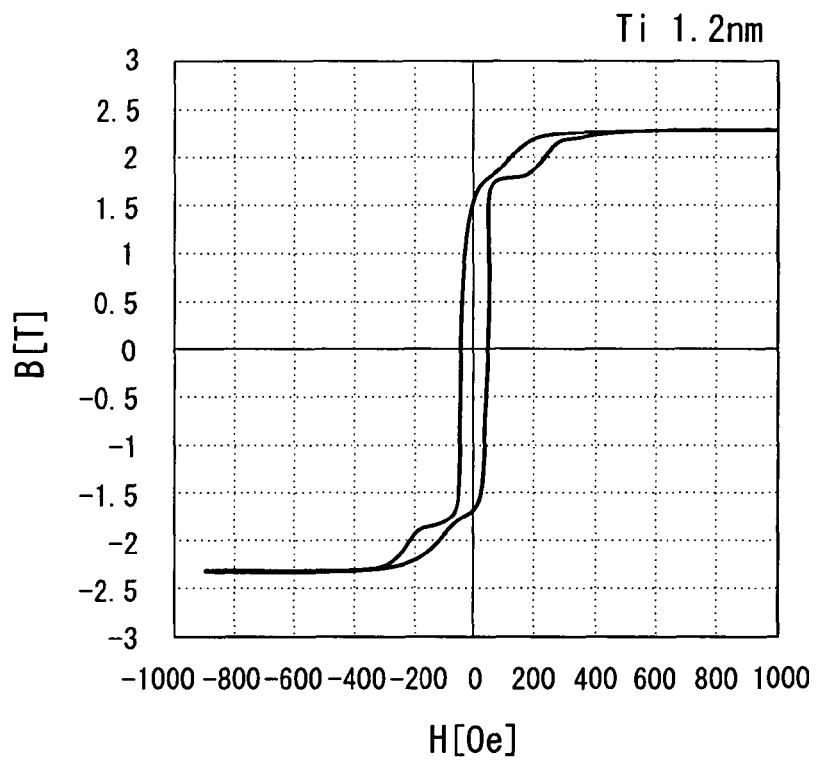
FIG. 26 is a plot showing the magnetization curve for a sample of the first experiment in which the nonmagnetic adhesion layer is a 1.2-nm-thick Ti layer.

FIG. 26 shows the magnetization curve for a sample in which the nonmagnetic adhesion layer 54 is made of Ti and 1.2 nm thick. The shape of this magnetization curve indicates that the magnetic layers 53 and 55 of this sample are not ferromagnetically coupled to each other.

The results shown in FIG. 22 to FIG. 26 indicate that when the nonmagnetic adhesion layer 54 is made of Ti, ferromagnetic coupling between the magnetic layers 53 and 55 is established if the thickness of the nonmagnetic adhesion layer 54 is 0.8 nm or smaller.

Figure 27:
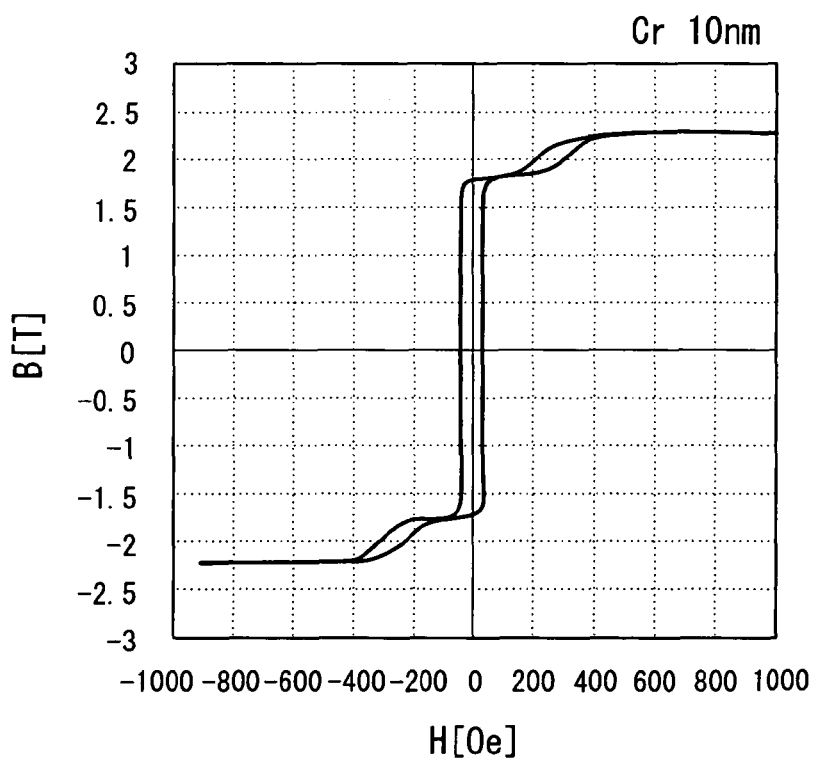
FIG. 27 is a plot showing the magnetization curve for a sample of the first experiment in which the nonmagnetic adhesion layer is a 10-nm-thick Cr layer.

FIG. 27 shows the magnetization curve for a sample in which the nonmagnetic adhesion layer 54 is made of Cr and 10 nm thick. The shape of this magnetization curve indicates that the magnetic layers 53 and 55 of this sample are not ferromagnetically coupled to each other.

Figure 28:
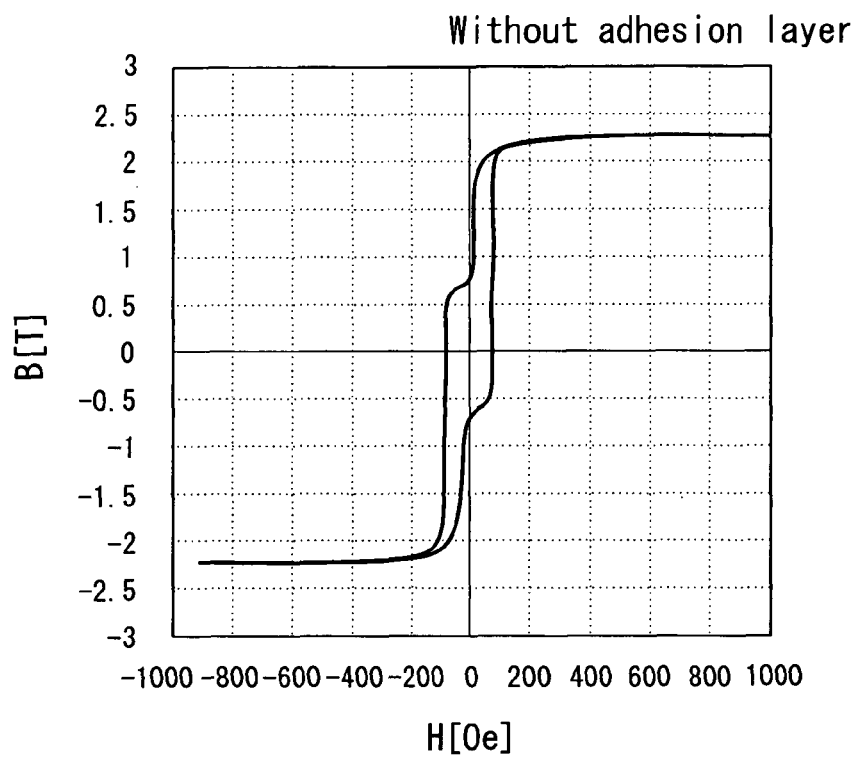
FIG. 28 is a plot showing the magnetization curve for a sample of the first experiment without the nonmagnetic adhesion layer.

FIG. 28 shows the magnetization curve for a sample without the nonmagnetic adhesion layer 54. The shape of this magnetization curve indicates that the magnetic layers 53 and 55 of this sample are ferromagnetically coupled to each other.

Figure 29:
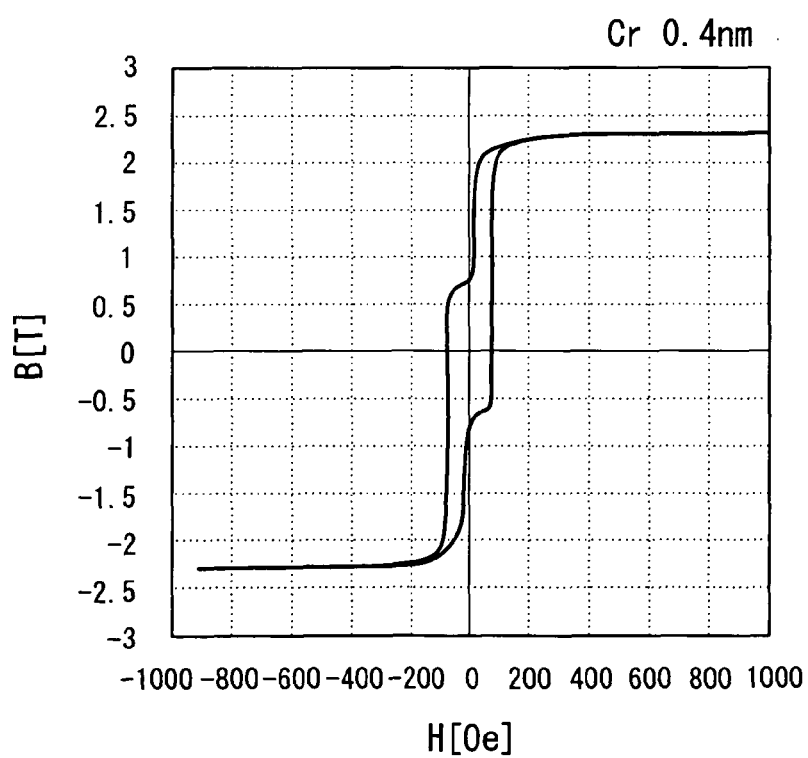
FIG. 29 is a plot showing the magnetization curve for a sample of the first experiment in which the nonmagnetic adhesion layer is a 0.4-nm-thick Cr layer.

FIG. 29 shows the magnetization curve for a sample in which the nonmagnetic adhesion layer 54 is made of Cr and 0.4 nm thick. The shape of this magnetization curve indicates that the magnetic layers 53 and 55 of this sample are ferromagnetically coupled to each other.

Figure 30:
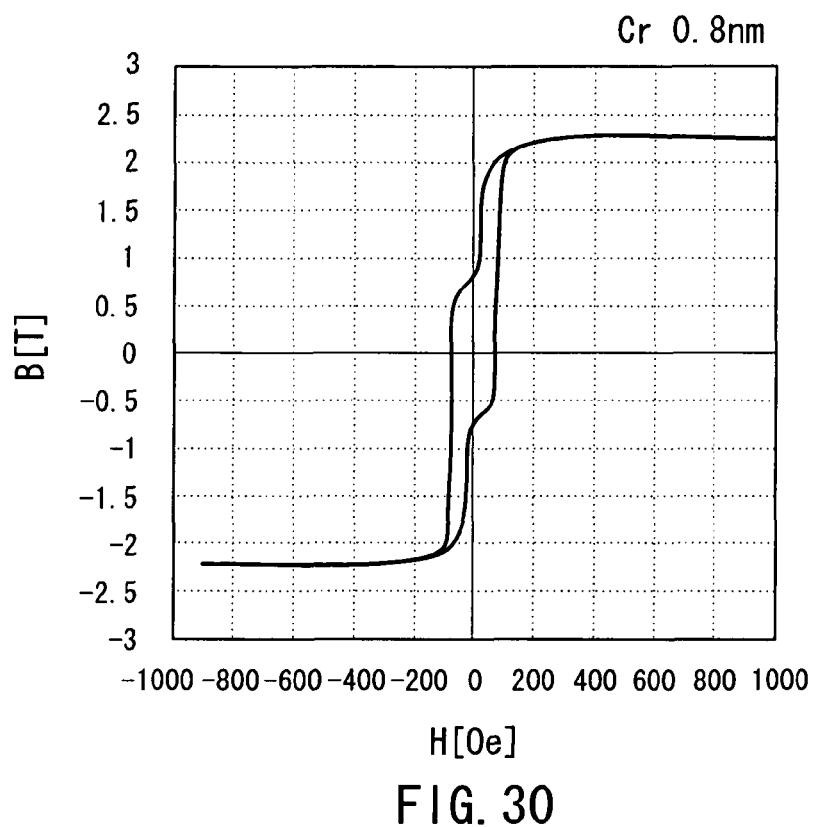
FIG. 30 is a plot showing the magnetization curve for a sample of the first experiment in which the nonmagnetic adhesion layer is a 0.8-nm-thick Cr layer.

FIG. 30 shows the magnetization curve for a sample in which the nonmagnetic adhesion layer 54 is made of Cr and 0.8 nm thick. The shape of this magnetization curve indicates that the magnetic layers 53 and 55 of this sample are ferromagnetically coupled to each other.

Figure 31:
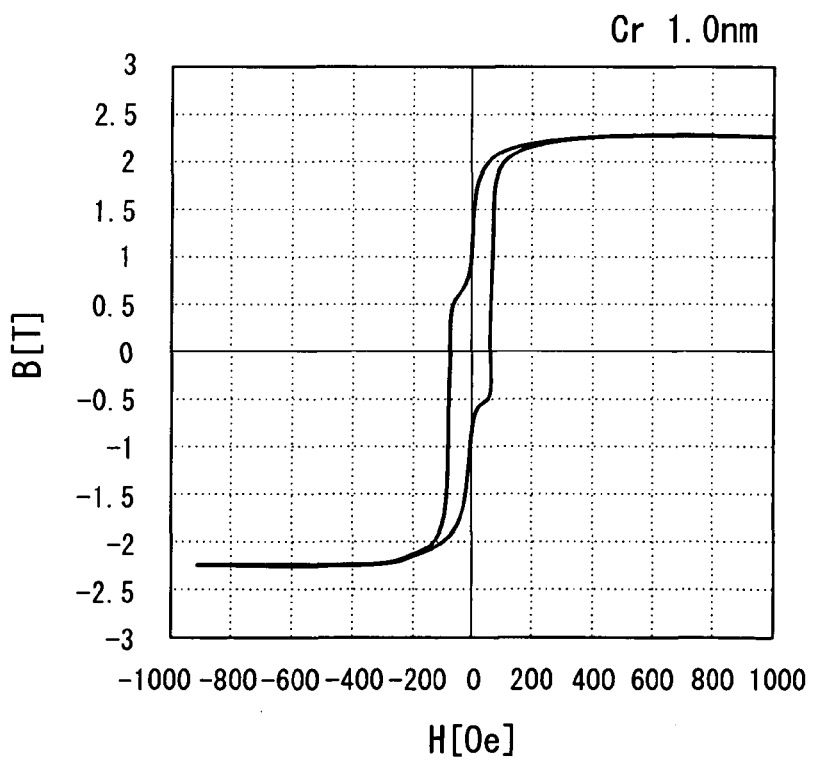
FIG. 31 is a plot showing the magnetization curve for a sample of the first experiment in which the nonmagnetic adhesion layer is a 1.0-nm-thick Cr layer.

FIG. 31 shows the magnetization curve for a sample in which the nonmagnetic adhesion layer 54 is made of Cr and 1.0 nm thick. The shape of this magnetization curve indicates that the magnetic layers 53 and 55 of this sample are ferromagnetically coupled to each other.

Figure 32:
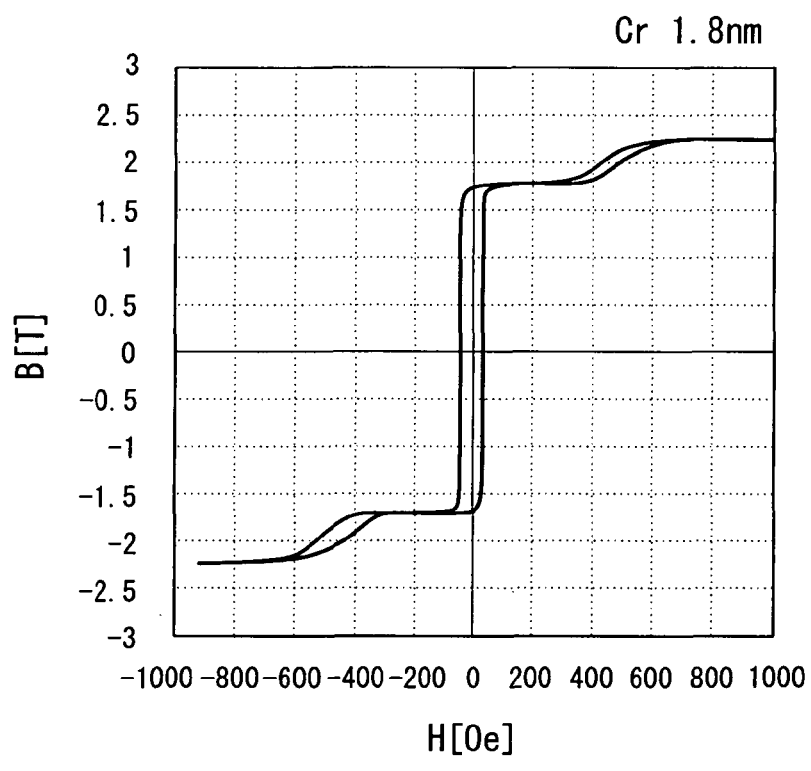
FIG. 32 is a plot showing the magnetization curve for a sample of the first experiment in which the nonmagnetic adhesion layer is a 1.8-nm-thick Cr layer.

FIG. 32 shows the magnetization curve for a sample in which the nonmagnetic adhesion layer 54 is made of Cr and 1.8 nm thick. The shape of this magnetization curve indicates that the magnetic layers 53 and 55 of this sample are not ferromagnetically coupled to each other.

The results shown in FIG. 27 to FIG. 32 indicate that when the nonmagnetic adhesion layer 54 is made of Cr, ferromagnetic coupling between the magnetic layers 53 and 55 is established if the thickness of the nonmagnetic adhesion layer is 1.0 nm or smaller.

The foregoing results of the first experiment indicate that when the thickness of the nonmagnetic adhesion layer is 0.8 nm or smaller, it is possible to establish ferromagnetic coupling between the first magnetic layer and the second magnetic layer that are adjacent to each other with the nonmagnetic adhesion layer disposed therebetween.

[Second Experiment]

A description will now be given on the results of a second experiment performed to study the relationship between the thickness of the nonmagnetic adhesion layer and the strength of adhesion of the nonmagnetic adhesion layer to an alumina layer serving as the nonmagnetic insulating layer. Prepared for the second experiment were a plurality of types of samples having the configuration shown in FIG. 33, a plurality of samples each for the plurality of types. Each sample includes a substrate 61 made of alumina-titanium carbide, an alumina layer 62 formed on the substrate 61, a nonmagnetic adhesion layer 63 formed on the alumina layer 62, and a magnetic layer 64 formed on the nonmagnetic adhesion layer 63. Each sample further includes a patterned magnetic layer 65 formed by frame plating, using the nonmagnetic adhesion layer 63 and the magnetic layer 64 as an electrode film. The patterned magnetic layer 65 is rectangular-solid-shaped and 20 μm high, and its top surface and bottom surface, the bottom surface touching the magnetic layer 64, are each in the shape of a rectangle having a length of approximately 45 μm and a width of approximately 35 μm. The nonmagnetic adhesion layer 63 is made of Ti or Cr. The thickness of the nonmagnetic adhesion layer 63 varies among types of samples. For the second experiment, also prepared were a plurality of samples without the nonmagnetic adhesion layer 63, in each of which the magnetic layer 64 was formed on the alumina layer 62 and the patterned magnetic layer 65 was formed by using the magnetic layer 64 as an electrode film.

Figure 33:
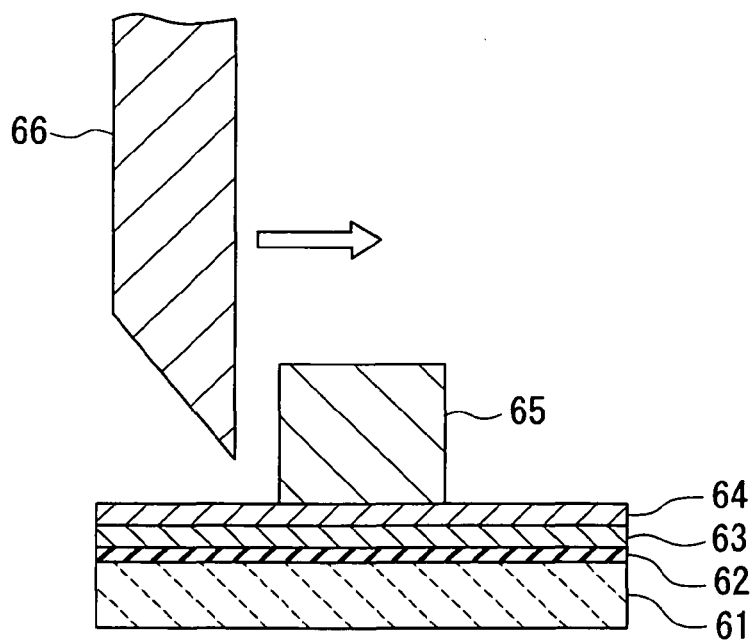
FIG. 33 is an illustrative view showing the method of a second experiment.
Figure 34:
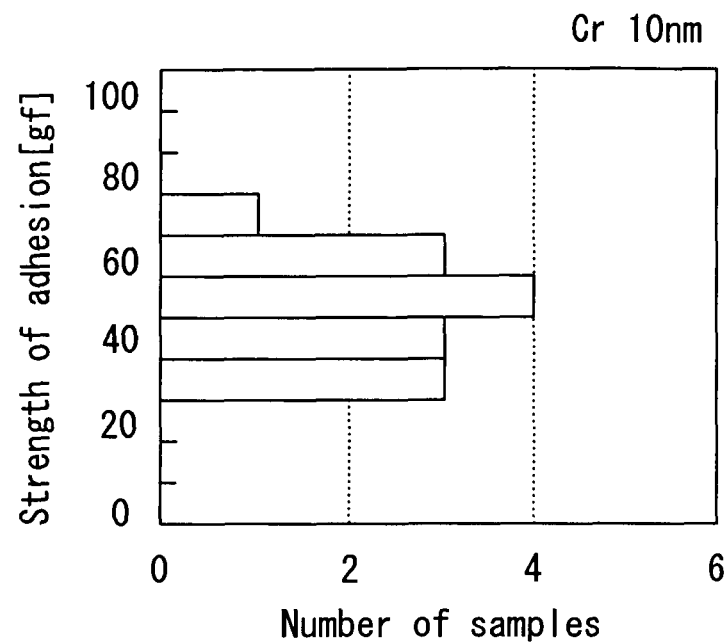
FIG. 34 is a histogram of the strength of adhesion for a plurality of samples of the second experiment in each of which the nonmagnetic adhesion layer is a 10-nm-thick Cr layer.
Figure 35:
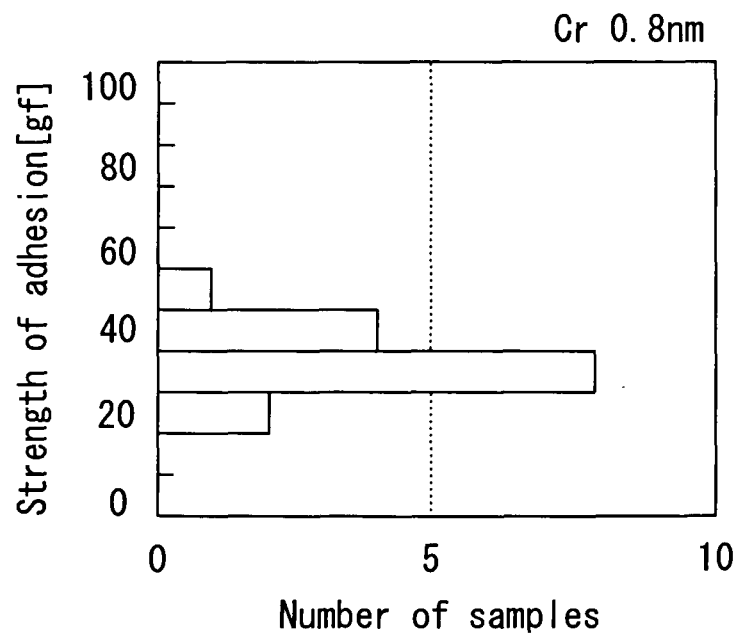
FIG. 35 is a histogram of the strength of adhesion for a plurality of samples of the second experiment in each of which the nonmagnetic adhesion layer is a 0.8-nm-thick Cr layer.
Figure 36:
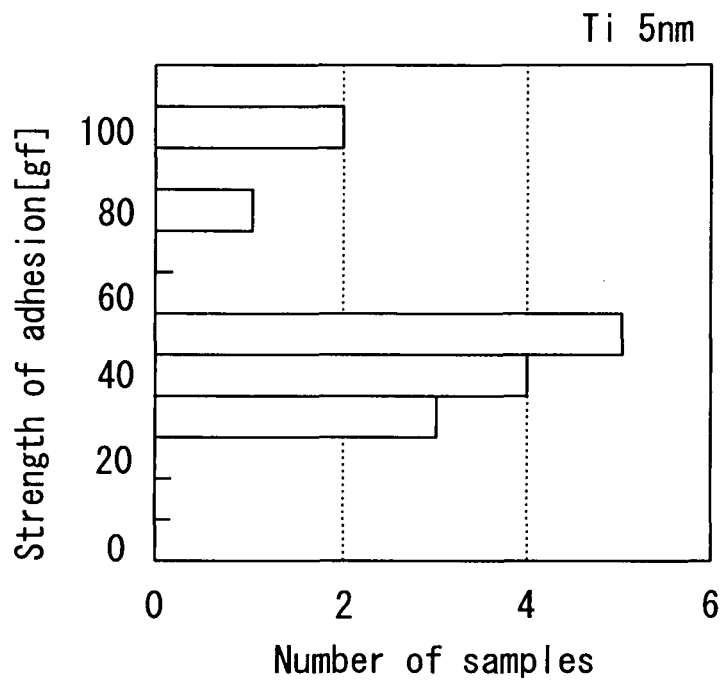
FIG. 36 is a histogram of the strength of adhesion for a plurality of samples of the second experiment in each of which the nonmagnetic adhesion layer is a 5-nm-thick Ti layer.
Figure 37:
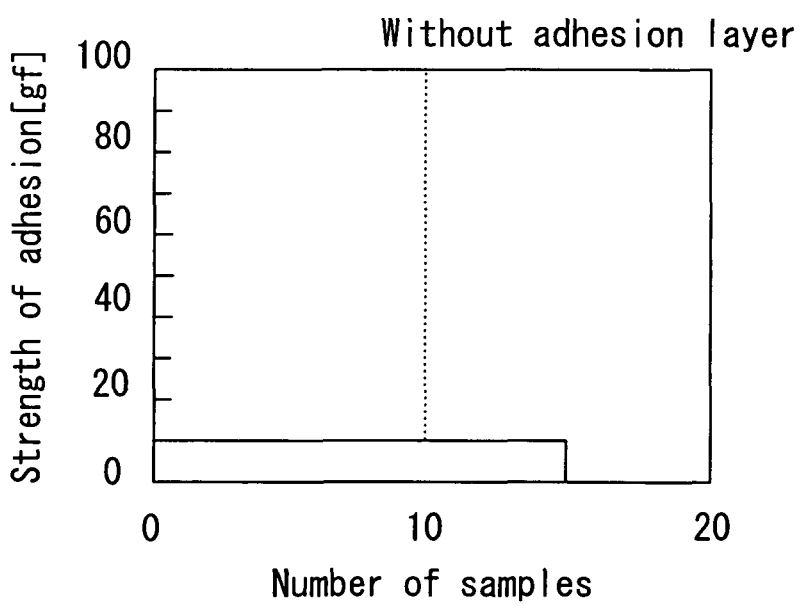
FIG. 37 is a histogram of the strength of adhesion for a plurality of samples of the second experiment each of which is without the nonmagnetic adhesion layer.
Figure 38:
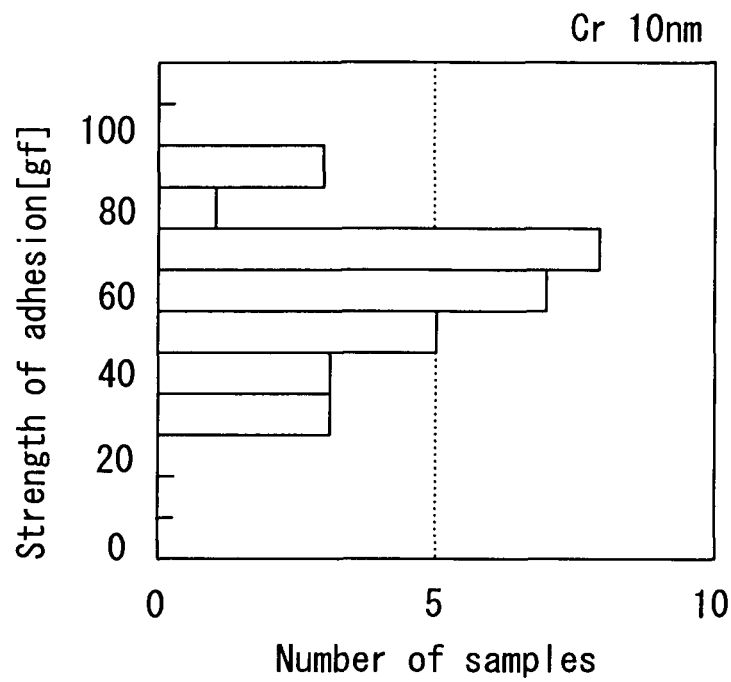
FIG. 38 is a histogram of the strength of adhesion for a plurality of samples of the second experiment in each of which the nonmagnetic adhesion layer is a 10-nm-thick Cr layer.
Figure 39:
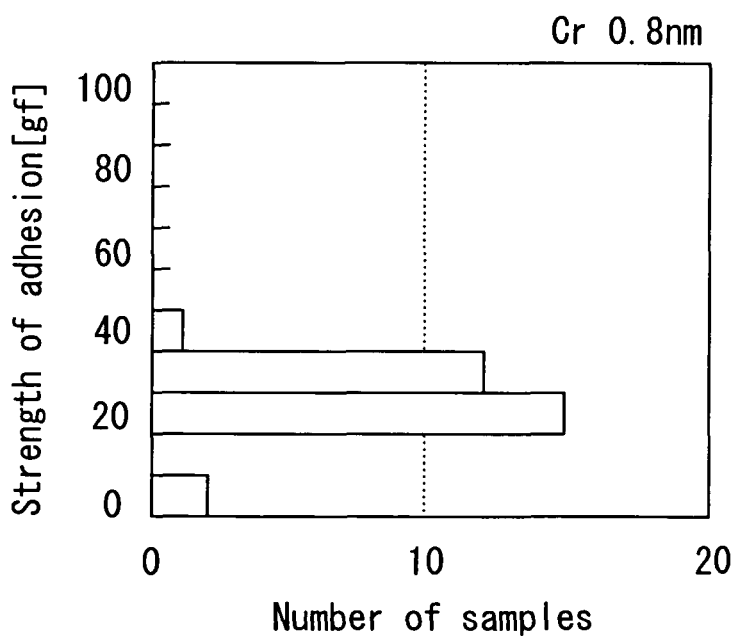
FIG. 39 is a histogram of the strength of adhesion for a plurality of samples of the second experiment in each of which the nonmagnetic adhesion layer is a 0.8-nm-thick Cr layer.
Figure 40:
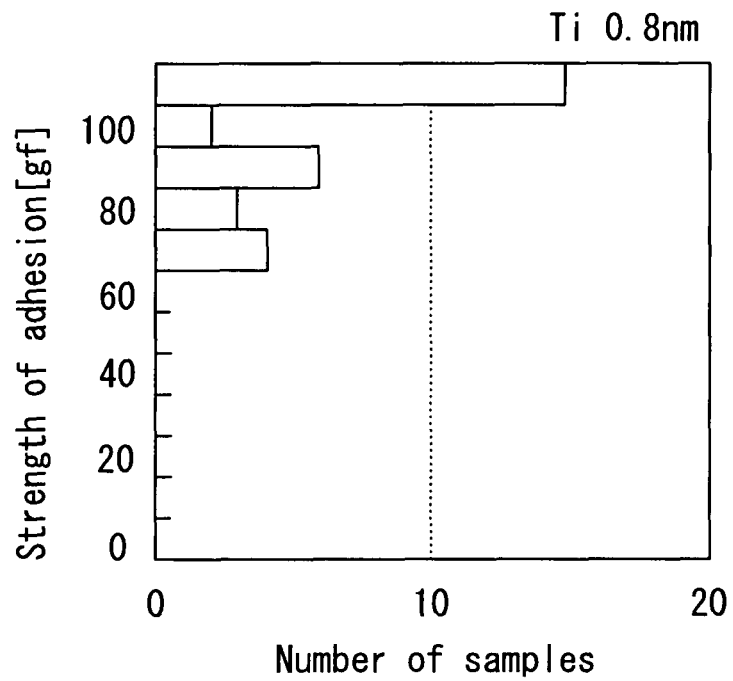
FIG. 40 is a histogram of the strength of adhesion for a plurality of samples of the second experiment in each of which the nonmagnetic adhesion layer is a 0.8-nm-thick Ti layer.

In the second experiment, the strength of adhesion of the nonmagnetic adhesion layer 63 or the magnetic layer 64 to the alumina layer 62 was investigated for the plurality of samples prepared, using a testing device described below. The testing device has a vertically extending needle-shaped jig 66 as shown in FIG. 33, and is capable of measuring the load applied by the jig 66 to the sample. In the second experiment, the jig 66 was brought into contact with the side surface of the patterned magnetic layer 65 and moved in a horizontal direction with a uniform speed, and the applied load at a time point when delamination occurred at an interface between any two of the layers of each sample during this operation was defined as the strength of adhesion. In the second experiment, a histogram of the strength of adhesion was also produced for each type of samples.

In a test for determining the strength of adhesion as above, obtained values of the strength of adhesion can vary depending on a factor such as the state of the jig. To cope with this, in the second experiment, a group of samples that underwent the testing at the same time frame was handled as one batch, and the distributions of the strength of adhesion were compared among types of samples within one batch.

A first batch includes: a plurality of samples of a first type in which the nonmagnetic adhesion layer 63 is made of Cr and 10 nm thick; a plurality of samples of a second type in which the nonmagnetic adhesion layer 63 is made of Cr and 0.8 nm thick; a plurality of samples of a third type in which the nonmagnetic adhesion layer 63 is made of Ti and 5 nm thick; and a plurality of samples of a fourth type without the nonmagnetic adhesion layer 63. FIG. 34 to FIG. 37 show the histograms of the strength of adhesion for the samples of the first to fourth types, respectively.

A second batch includes: a plurality of samples of a fifth type in which the nonmagnetic adhesion layer 63 is made of Cr and 10 nm thick; a plurality of samples of a sixth type in which the nonmagnetic adhesion layer 63 is made of Cr and 0.8 nm thick; a plurality of samples of a seventh type in which the nonmagnetic adhesion layer 63 is made of Ti and 0.8 nm thick; and a plurality of samples of an eighth type in which the nonmagnetic adhesion layer 63 is made of Au and 10 nm thick. FIG. 38 to FIG. 41 show the histograms of the strength of adhesion for the samples of the fifth to eighth types, respectively.

A third batch includes: a plurality of samples of a ninth type in which the nonmagnetic adhesion layer 63 is made of Ti and 0.3 nm thick; a plurality of samples of a tenth type in which the nonmagnetic adhesion layer 63 is made of Ti and 0.5 nm thick; a plurality of samples of an eleventh type in which the nonmagnetic adhesion layer 63 is made of Ti and 0.8 nm thick; and a plurality of samples of a twelfth type without the nonmagnetic adhesion layer 63. FIG. 42 to FIG. 45 show the histograms of the strength of adhesion for the samples of the ninth to twelfth types, respectively.

Figure 46:
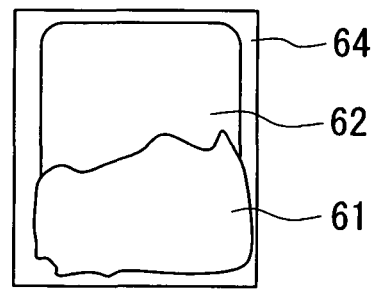
FIG. 46 is an illustrative view showing a fracture surface of a sample of the second experiment in which the nonmagnetic adhesion layer is a 0.3-nm-thick Ti layer.
Figure 47:
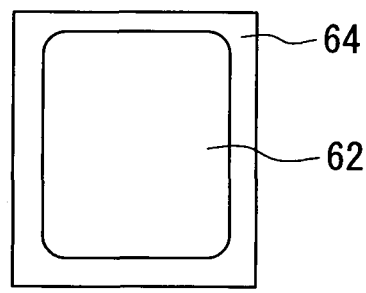
FIG. 47 is an illustrative view showing a fracture surface of a sample of the second experiment in which the nonmagnetic adhesion layer is a 10-nm-thick Cr layer.
Figure 48:
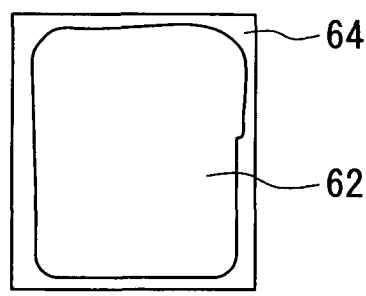
FIG. 48 is an illustrative view showing a fracture surface of a sample of the second experiment without the nonmagnetic adhesion layer.

FIG. 46 is an illustrative view showing a fracture surface of a sample of the ninth type in which the nonmagnetic adhesion layer 63 is made of Ti and 0.3 nm thick. FIG. 47 is an illustrative view showing a fracture surface of a sample of each of the first and fifth types in which the nonmagnetic adhesion layer 63 is made of Cr and 10 nm thick. FIG. 48 is an illustrative view showing a fracture surface of a sample of each of the fourth and twelfth types without the nonmagnetic adhesion layer 63. The fracture surface of FIG. 46 shows the substrate 61 in addition to the alumina layer 62. In contrast, each of the fracture surfaces of FIG. 47 and FIG. 48 shows the alumina layer 62 but does not show the substrate 61.

When the nonmagnetic adhesion layer 63 was not provided (FIG. 37, FIG. 45) or was made of Au (FIG. 41), the strength of adhesion was equal to or lower than the measurable lower limit (10 gf) in almost all the samples.

FIG. 36, FIG. 40, FIG. 42 to FIG. 44 indicate that when the nonmagnetic adhesion layer 63 is made of Ti, roughly equivalent and sufficiently high strength of adhesion is obtained over the 0.3- to 5-nm range of thickness of the nonmagnetic adhesion layer 63. Furthermore, FIG. 46 indicates that when the nonmagnetic adhesion layer 63 is made of Ti, delamination occurs mainly at the interface between the substrate 61 and the alumina layer 62. This indicates that when the nonmagnetic adhesion layer 63 is made of Ti, the strength of adhesion between the nonmagnetic adhesion layer 63 and the alumina layer 62 is equal to or higher than that between the substrate 61 and the alumina layer 62.

Figure 41:
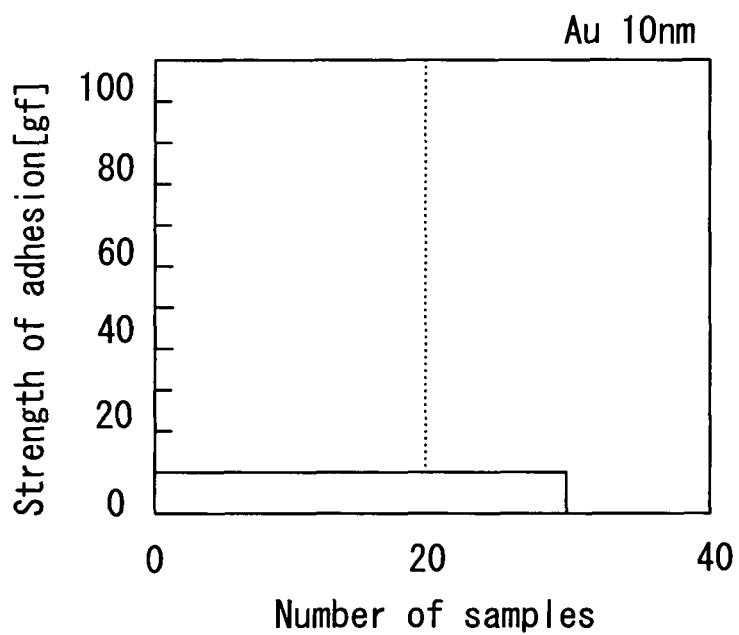
FIG. 41 is a histogram of the strength of adhesion for a plurality of samples of the second experiment in each of which the nonmagnetic adhesion layer is a 10-nm-thick Au layer.
Figure 42:
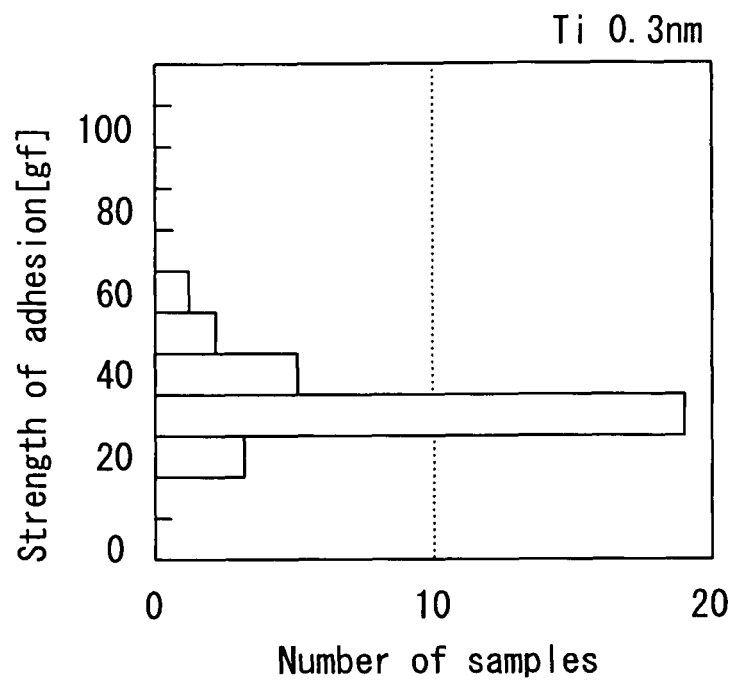
FIG. 42 is a histogram of the strength of adhesion for a plurality of samples of the second experiment in each of which the nonmagnetic adhesion layer is a 0.3-nm-thick Ti layer.
Figure 43:
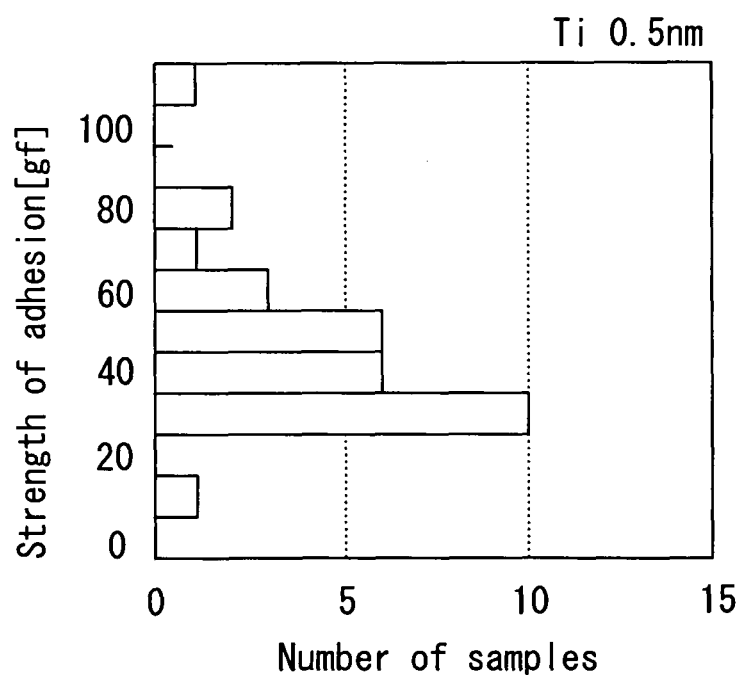
FIG. 43 is a histogram of the strength of adhesion for a plurality of samples of the second experiment in each of which the nonmagnetic adhesion layer is a 0.5-nm-thick Ti layer.
Figure 44:
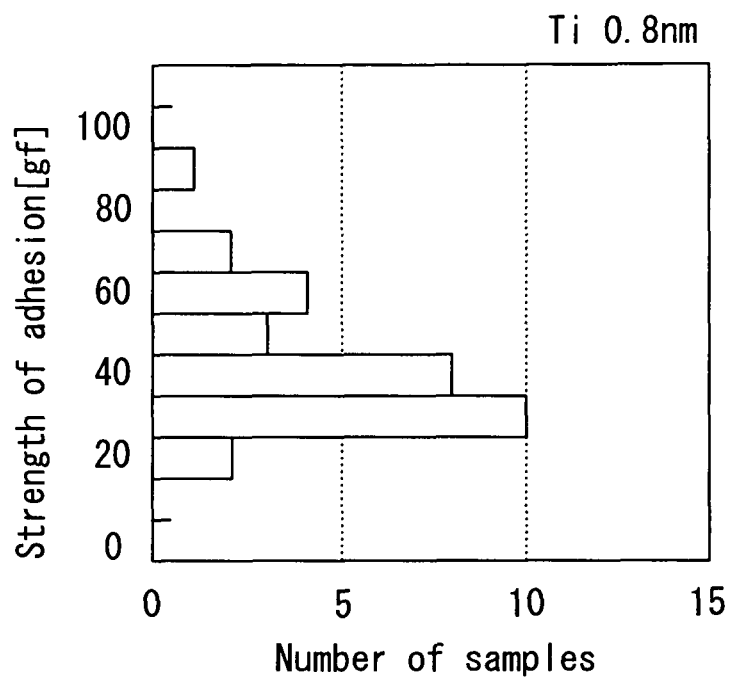
FIG. 44 is a histogram of the strength of adhesion for a plurality of samples of the second experiment in each of which the nonmagnetic adhesion layer is a 0.8-nm-thick Ti layer.
Figure 45:
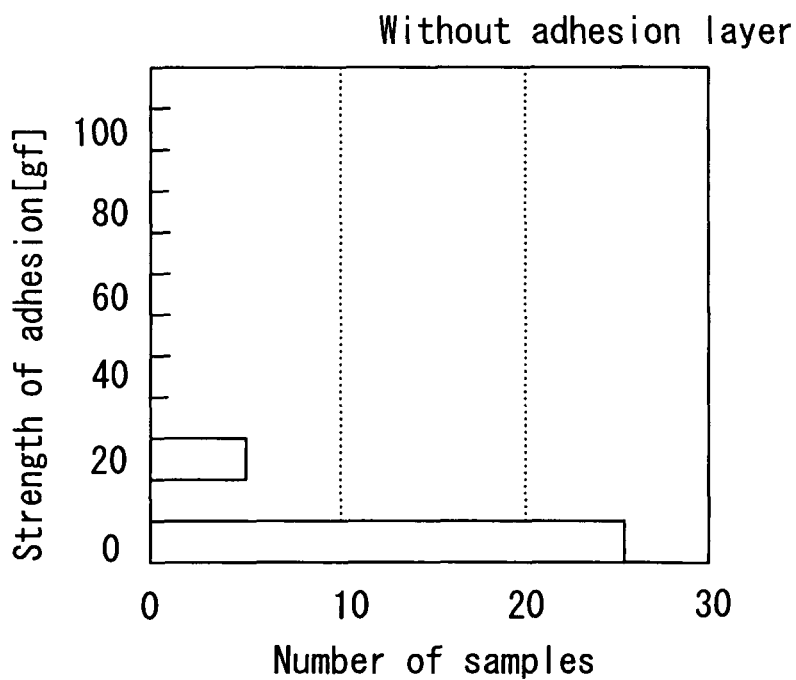
FIG. 45 is a histogram of the strength of adhesion for a plurality of samples of the second experiment each of which is without the nonmagnetic adhesion layer.

When the nonmagnetic adhesion layer 63 is made of Cr and 0.8 nm thick (FIG. 35, FIG. 39), the strength of adhesion is lower than when the nonmagnetic adhesion layer 63 is made of Cr and 10 nm thick (FIG. 34, FIG. 38), but much higher than in the cases where the nonmagnetic adhesion layer 63 is not provided (FIG. 37, FIG. 45) and where the nonmagnetic adhesion layer 63 is made of Au (FIG. 41).

The foregoing results of the second experiment indicate that it is possible to obtain sufficiently high adhesion between the nonmagnetic adhesion layer and an alumina layer serving as the nonmagnetic insulating layer if the thickness of the nonmagnetic adhesion layer is 0.3 nm or greater. As can be seen from the results of the first and second experiments, if the thickness of the nonmagnetic adhesion layer is within the range of 0.3 to 0.8 nm, it is possible to ensure adhesion of the nonmagnetic adhesion layer to the first magnetic layer and the nonmagnetic insulating layer and to establish ferromagnetic coupling between the first magnetic layer and the second magnetic layer.

[Third Experiment]

A description will now be given on the results of a third experiment performed to study the adhesion of the nonmagnetic adhesion layer to a thermosetting resin layer serving as the nonmagnetic insulating layer. For the third experiment, prepared were a plurality of samples each formed by stacking the nonmagnetic adhesion layer 63, the magnetic layer 64 and the patterned magnetic layer 65 shown in FIG. 33 in this order on a thermosetting rein layer. As in the second experiment, in each sample the patterned magnetic layer 65 was formed by frame plating, using the nonmagnetic adhesion layer 63 and the magnetic layer 64 as an electrode film. For the third experiment, also prepared were a plurality of samples without the nonmagnetic adhesion layer 63, in each of which the magnetic layer 64 was formed on the thermosetting resin layer and the patterned magnetic layer 65 was formed by using the magnetic layer 64 as an electrode film. The samples prepared for the third experiment fall into four types: a first type in which the nonmagnetic adhesion layer 63 is a 5-nm-thick Ti layer; a second type in which the nonmagnetic adhesion layer 63 is a 0.8-nm-thick Ti layer; a third type in which the nonmagnetic adhesion layer 63 is a 0.8-nm-thick Cr layer; and a fourth type without the nonmagnetic adhesion layer 63.

Figure 49:
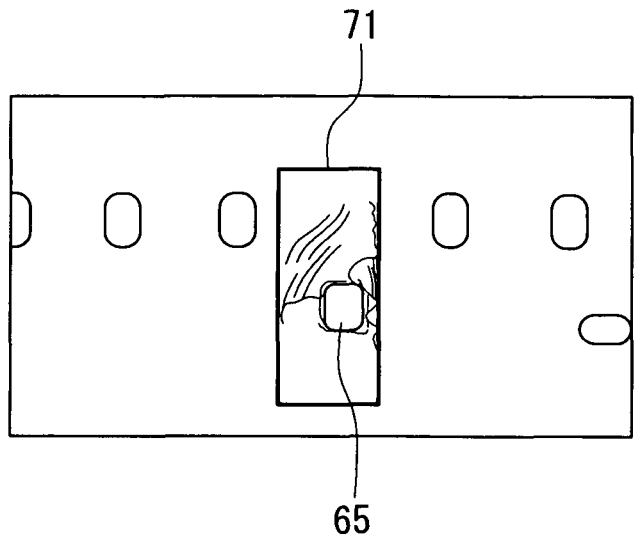
FIG. 49 is an illustrative view showing an occurrence of lifting of an electrode film in a third experiment.

In the third experiment, 50 samples were prepared for each of the above four types and the occurrence of lifting of the electrode film was investigated for each of the samples. The term "lifting" of a film refers to a state in which part of a film formed on an underlying layer is peeling off and thereby lifts off from the underlying layer. FIG. 49 shows an occurrence of lifting of the electrode film in any of the above samples. Numeral 71 in FIG. 49 indicates the region in which the thermosetting resin layer is formed. The thermosetting resin layer is covered with the electrode film, and the patterned magnetic layer 65 is formed on the electrode film.

Figure 50:
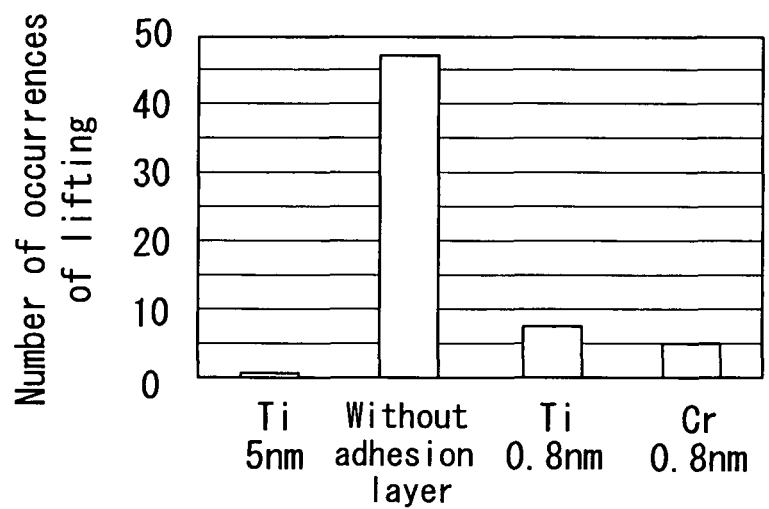
FIG. 50 is a histogram showing the number of occurrences of lifting of the electrode film in four types of samples of the third experiment.

FIG. 50 is a histogram showing the number of occurrences of lifting of the electrode film in the above four types of samples. As shown in FIG. 50, for each of the case where the nonmagnetic adhesion layer 63 is a 0.8-nm-thick Ti layer and the case where the nonmagnetic adhesion layer 63 is a 0.8-nm-thick Cr layer, the rate of occurrences of the lifting (the number of occurrences of the lifting/50) is slightly higher than that for the case where the nonmagnetic adhesion layer 63 is a 5-nm-thick Ti layer, but greatly lower than that for the case without the nonmagnetic adhesion layer 63. The results of the third experiment indicate that even when the thickness of the nonmagnetic adhesion layer is as small as 0.8 nm, it is possible to obtain sufficiently high adhesion of the nonmagnetic adhesion layer to a thermosetting resin layer serving as the nonmagnetic insulating layer.

The present invention is not limited to the foregoing embodiment but can be carried out in various modifications. For example, materials usable for the nonmagnetic adhesion layer of the present invention are not limited to those used in the experiments, but can be any materials as long as the requirements defined in claims are satisfied.

While the foregoing embodiment has been described with reference to a magnetic head for the perpendicular magnetic recording system, the present invention is also applicable to a magnetic head for the longitudinal magnetic recording system. Furthermore, the present invention is applicable not only to a magnetic structure for use in a magnetic head but also to any magnetic structure in which a second magnetic layer is disposed over a first magnetic layer and a nonmagnetic insulating layer, with a nonmagnetic adhesion layer provided in between.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A magnetic structure comprising:
   a first magnetic layer having a top surface;
   a nonmagnetic insulating layer having a top surface, the nonmagnetic insulating layer being adjacent to the first magnetic layer without overlapping the top surface of the first magnetic layer;
   a nonmagnetic adhesion layer disposed on the top surfaces of the first magnetic layer and the nonmagnetic insulating layer; and
   a second magnetic layer disposed on the nonmagnetic adhesion layer, the second magnetic layer being in direct contact with the nonmagnetic adhesion layer, wherein:
   the nonmagnetic insulating layer contains an oxygen atom;
   the nonmagnetic adhesion layer is composed of one element or a plurality of elements selected from the group consisting of Al, Si and nonmagnetic transition metal elements except Ru, and a bond enthalpy of a diatomic molecule composed of an atom of the one element or each of the plurality of elements and an oxygen atom is 400 kJ/mol or higher;
   the nonmagnetic adhesion layer has a thickness within a range of 0.3 to 0.8 nm; and
   the first magnetic layer and the second magnetic layer are ferromagnetically coupled to each other.

2. The magnetic structure according to claim 1, further comprising a third magnetic layer disposed on the second magnetic layer.

3. The magnetic structure according to claim 1, being for use in a magnetic head.

4. A magnetic structure comprising:
a first magnetic layer having a top surface;
a nonmagnetic insulating layer having a top surface, the nonmagnetic insulating layer being disposed to cover a portion of the top surface of the first magnetic layer;
a nonmagnetic adhesion layer disposed on the top surfaces of the first magnetic layer and the nonmagnetic insulating layer; and
a second magnetic layer disposed on the nonmagnetic adhesion layer, the second magnetic layer being in direct contact with the nonmagnetic adhesion layer, wherein:
the nonmagnetic insulating layer contains an oxygen atom;
the nonmagnetic adhesion layer is composed of one element or a plurality of elements selected from the group consisting of Al, Si and nonmagnetic transition metal elements except Ru, and a bond enthalpy of a diatomic molecule composed of an atom of the one element or each of the plurality of elements and an oxygen atom is 400 kJ/mol or higher;
the nonmagnetic adhesion layer has a thickness within a range of 0.3 to 0.8 nm; and
the first magnetic layer and the second magnetic layer are ferromagnetically coupled to each other.

5. The magnetic structure according to claim 4, further comprising a third magnetic layer disposed on the second magnetic layer.

6. The magnetic structure according to claim 4, being for use in a magnetic head.

7. A method of manufacturing a magnetic structure, the magnetic structure comprising: a first magnetic layer having a top surface; a nonmagnetic insulating layer having a top surface, the nonmagnetic insulating layer being adjacent to the first magnetic layer without overlapping the top surface of the first magnetic layer; a nonmagnetic adhesion layer disposed on the top surfaces of the first magnetic layer and the nonmagnetic insulating layer; and a second magnetic layer disposed on the nonmagnetic adhesion layer,
the method comprising the steps of:
forming the first magnetic layer and the nonmagnetic insulating layer;
forming the nonmagnetic adhesion layer on the top surfaces of the first magnetic layer and the nonmagnetic insulating layer; and
forming the second magnetic layer on the nonmagnetic adhesion layer, the second magnetic layer being in direct contact with the nonmagnetic adhesion layer, wherein:
the nonmagnetic insulating layer contains an oxygen atom;
the nonmagnetic adhesion layer is composed of one element or a plurality of elements selected from the group consisting of Al, Si and nonmagnetic transition metal elements except Ru, and a bond enthalpy of a diatomic molecule composed of an atom of the one element or each of the plurality of elements and an oxygen atom is 400 kJ/mol or higher;
the nonmagnetic adhesion layer has a thickness within a range of 0.3 to 0.8 nm; and
the first magnetic layer and the second magnetic layer are ferromagnetically coupled to each other.

8. The method of manufacturing the magnetic structure according to claim 7, wherein the nonmagnetic adhesion layer and the second magnetic layer are formed successively in a vacuum.

9. The method of manufacturing the magnetic structure according to claim 7, further comprising the step of forming a third magnetic layer on the second magnetic layer.

10. The method of manufacturing the magnetic structure according to claim 9, wherein the third magnetic layer is formed by plating.

11. A method of manufacturing a magnetic structure, the magnetic structure comprising: a first magnetic layer having a top surface; a nonmagnetic insulating layer having a top surface, the nonmagnetic insulating layer being disposed to cover a portion of the top surface of the first magnetic layer; a nonmagnetic adhesion layer disposed on the top surfaces of the first magnetic layer and the nonmagnetic insulating layer; and a second magnetic layer disposed on the nonmagnetic adhesion layer,
the method comprising the steps of:
forming the first magnetic layer;
forming the nonmagnetic insulating layer;
forming the nonmagnetic adhesion layer on the top surfaces of the first magnetic layer and the nonmagnetic insulating layer; and
forming the second magnetic layer on the nonmagnetic adhesion layer, the second magnetic layer being in direct contact with the nonmagnetic adhesion layer, wherein:
the nonmagnetic insulating layer contains an oxygen atom;
the nonmagnetic adhesion layer is composed of one element or a plurality of elements selected from the group consisting of Al, Si and nonmagnetic transition metal elements except Ru, and a bond enthalpy of a diatomic molecule composed of an atom of the one element or each of the plurality of elements and an oxygen atom is 400 kJ/mol or higher;
the nonmagnetic adhesion layer has a thickness within a range of 0.3 to 0.8 nm; and
the first magnetic layer and the second magnetic layer are ferromagnetically coupled to each other.

12. The method of manufacturing the magnetic structure according to claim 11, wherein the nonmagnetic adhesion layer and the second magnetic layer are formed successively in a vacuum.

13. The method of manufacturing the magnetic structure according to claim 11, further comprising the step of forming a third magnetic layer on the second magnetic layer.

14. The method of manufacturing the magnetic structure according to claim 13, wherein the third magnetic layer is formed by plating.

* * * * *